US012676010B2

(12) United States Patent
Lim et al.

(10) Patent No.: US 12,676,010 B2
(45) Date of Patent: Jul. 7, 2026

(54) OBJECT RECOGNITION APPARATUS AND VEHICLE HAVING THE SAME

(71) Applicants: Hyundai Motor Company, Seoul (KR); Kia Corporation, Seoul (KR)

(72) Inventors: Jonghyuk Lim, Seoul (KR); Heechul Choi, Seoul (KR); Junhyung Kim, Seoul (KR); Taekoan Yoo, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 298 days.

(21) Appl. No.: 18/318,968

(22) Filed: May 17, 2023

(65) Prior Publication Data

US 2024/0046658 A1 Feb. 8, 2024

(30) Foreign Application Priority Data

Aug. 8, 2022 (KR) ........................ 10-2022-0098288

(51) Int. Cl.
*G06V 20/58* (2022.01)
*G01S 17/86* (2020.01)
(Continued)

(52) U.S. Cl.
CPC .............. *G06V 20/58* (2022.01); *G01S 17/86* (2020.01); *G01S 17/89* (2013.01); *G06T 7/62* (2017.01); *G06V 10/25* (2022.01); *G06V 10/764* (2022.01); *G06V 20/64* (2022.01); *G06T 2207/20224* (2013.01)

(58) Field of Classification Search
None
See application file for complete search history.

(56) References Cited

U.S. PATENT DOCUMENTS 11,521,394 B2 12/2022 Beijbom et al.
2010/0246901 A1 9/2010 Yang
(Continued)

FOREIGN PATENT DOCUMENTS

CN 112711034 A 4/2021
JP 2009129001 A 6/2009
(Continued)

OTHER PUBLICATIONS

I.-S. Weon, S.-G. Lee and J.-K. Ryu, "Object Recognition Based Interpolation With 3D LIDAR and Vision for Autonomous Driving of an Intelligent Vehicle," in IEEE Access, vol. 8, pp. 65599-65608, 2020, doi: 10.1109/ACCESS.2020.2982681. (Year: 2020).*

*Primary Examiner* — Mark R Milia
(74) *Attorney, Agent, or Firm* — Slater Matsil, LLP

(57) ABSTRACT

An embodiment object recognition apparatus includes a Lidar sensor and one or more processors, at least one of the one or more processors being configured to recognize objects based on data received from the Lidar sensor, obtain a minimum value and a maximum value among values of a ground height for each object based on the data, obtain a reference value of the ground height for each object based on the minimum value for each object, and determine an actual value of the ground height for each object based on a difference between the minimum value, the maximum value, and the reference value of the ground height for each object.

20 Claims, 23 Drawing Sheets

1

(51) Int. Cl.
     *G01S 17/89*     (2020.01)
     *G06T 7/62*     (2017.01)
     *G06V 10/25*     (2022.01)
     *G06V 10/764*     (2022.01)
     *G06V 20/64*     (2022.01)

(56)            References Cited

U.S. PATENT DOCUMENTS

| | | | |
|---|---|---|---|
| 2020/0158874 A1* | 5/2020 | Li | G06V 20/584 |
| 2020/0200912 A1* | 6/2020 | Chen | G06V 20/582 |
| 2021/0048529 A1 | 2/2021 | Roy Chowdhury et al. | |
| 2022/0111868 A1* | 4/2022 | Costea | B60W 30/0956 |

FOREIGN PATENT DOCUMENTS

| | | | |
|---|---|---|---|
| JP | 2021111302 A | 8/2021 |
| KR | 20210135206 A | 11/2021 |
| KR | 20220047713 A | 4/2022 |

\* cited by examiner

200

OBJECT RECOGNITION APPARATUS AND VEHICLE HAVING THE SAME

CROSS-REFERENCE TO RELATED APPLICATIONS

This application claims the benefit of Korean Patent Application No. 10-2022-0098288, filed on Aug. 8, 2022, which application is hereby incorporated herein by reference.

TECHNICAL FIELD

The disclosure relates to an object recognition apparatus and a vehicle having the same.

BACKGROUND

A vehicle may include a driver assistance device that includes at least one of an ultrasonic sensor, an image sensor, a laser sensor, and a Lidar sensor capable of replacing a human field of view and automatically drives the vehicle without manipulation of a driver while collecting information related to driving of the vehicle using the at least one sensor and recognizing objects such as obstacles in front or outputs a notification about a possibility of a collision with a recognized object.

Such a driver assistance device prevents an accident by assisting a driver in recognizing a road environment even when the driver may not accurately recognize the road environment due to carelessness or mistake of the driver and the limitation of a field of view.

When an existing vehicle recognizes an object using an image sensor of the vehicle, a case in which a shadow of the object is incorrectly recognized as the object may occur, or the object may be misrecognized due to direct sunlight, a light reflecting object, a strong light source behind, or a low-light environment.

When an existing vehicle recognizes objects using an ultrasonic sensor, a laser sensor, or a Lidar sensor, the existence or non-existence and distances of the objects may be checked, but the objects in front obstruct a field of view of the sensor in a road congestion situation, so that a shape and location of an object located further ahead may not be accurately recognized.

SUMMARY

The disclosure relates to an object recognition apparatus and a vehicle having the same. Particular embodiments relate to an object recognition apparatus for recognizing a surrounding object and a vehicle having the same.

An embodiment of the disclosure provides an object recognition apparatus for recognizing a type and location of an object based on data detected by a Lidar sensor, recognizing a value of a ground height based on the type and location of the recognized object, and recognizing three-dimensional information of the object based on an actual value of the recognized ground height, and a vehicle having the same.

Additional embodiments of the disclosure will be set forth in part in the description which follows and, in part, will be obvious from the description, or may be learned by practice of the disclosure.

In accordance with an embodiment of the disclosure, an object recognition apparatus includes a Lidar sensor and at least one processor configured to recognize objects based on data received from the Lidar sensor. The at least one processor obtains a minimum value and a maximum value among values of a ground height for each object based on the data, obtains a reference value of the ground height for each object based on the minimum value for each object, and determines an actual value of the ground height for each object based on a difference between the minimum value, the maximum value, and the reference value of the ground height for each object.

The at least one processor may generate a ground trend line using a multiple linear regression model for the minimum value for each object and obtain the reference value of the ground height for each object based on the generated ground trend line.

The at least one processor may obtain an X-axis value and a Y-axis value for each object based on the data received from the Lidar sensor and obtain a Z map in which a Z-axis value corresponding to the X-axis value and the Y-axis value for each object is matched. The Z-axis value may include the ground height values.

The object recognition apparatus may further include a memory provided to store information on a height for each type. The at least one processor may recognize a type, size, and yaw angle for each object based on the X-axis value and the Y-axis value for each object and obtain the height corresponding to the type for each object based on the information stored in the memory.

When determining an actual value of the ground height of a first object of the objects, the at least one processor may obtain a first difference value between the maximum value and the minimum value of the ground height of the first object, obtain a second difference value between the maximum value and the reference value of the ground height of the first object, and determine the actual value of the ground height of the first object based on whether the obtained first difference value and the height of the first object are the same and whether the obtained second difference value and the height of the first object are the same.

The at least one processor may determine the actual value of the ground height of the first object as the minimum value of the ground height of the first object when the first difference value and the height of the first object are the same and the second difference value and the height of the first object are the same.

The at least one processor may determine the actual value of the ground height of the first object as the minimum value of the ground height of the first object when the first difference value and the height of the first object are the same and the second difference value and the height of the first object are different.

The at least one processor may determine the actual value of the ground height of the first object as the reference value of the ground height of the first object when the first difference value and the height of the first object are different and the second difference value and the height of the first object are the same.

The at least one processor may subtract the height of the first object from the maximum value of the ground height of the first object and determine the subtracted value as the actual value of the ground height of the first object when the first difference value and the height of the first object are different and the second difference value and the height of the first object are different.

The at least one processor may determine the actual value of the ground height of the first object as the minimum value of the ground height of the first object when the first difference value and the height of the first object are different, the second difference value and the height of the first object are different, and the reference value and the minimum value of the ground height of the first object are the same.

In accordance with an embodiment of the disclosure, an object recognition apparatus includes a Lidar sensor and a processor configured to obtain X-axis values and Y-axis values of an object based on data received from the Lidar sensor, recognize a type and height of the object based on the X-axis values and the Y-axis values of the object, obtain Z-axis values corresponding to the X-axis values and the Y-axis values of the object, respectively, obtain a minimum value and a maximum value among the Z-axis values, obtain a reference value corresponding to the minimum value, and determine an actual value of a ground height of the object based on the minimum value, the maximum value, the reference value of the Z-axis, and the height of the object.

The processor may generate a ground trend line using a multiple linear regression model for the maximum value among the Z-axis values of a plurality of the objects and obtain the reference value using the generated ground trend line.

The processor may obtain a first difference value between the maximum value and the minimum value of the ground height of the object, obtain a second difference value between the maximum value and the reference value of the ground height of the object, and determine the actual value of the ground height of the object as the minimum value of the ground height of the object when the first difference value and the height of the object are the same and the second difference value and the height of the object are the same.

The processor may determine the actual value of the ground height of the object as the reference value of the ground height of the object when the first difference value and the height of the object are different and the second difference value and the height of the object are the same.

The processor may subtract the height of the object from the maximum value and determine the subtracted value as the actual value of the ground height of the object when the first difference value and the height of the object are different, the second difference value and the height of the object are different, and the maximum value and the reference value are the same.

The processor may determine the actual value of the ground height of the object as the minimum value of the ground height of the object when the first difference value and the height of the object are different, the second difference value and the height of the object are different, and the reference value and the minimum value of the ground height of the object are the same.

In accordance with an embodiment of the disclosure, a vehicle includes a camera, a Lidar sensor, an object recognition apparatus configured to obtain X-axis values and Y-axis values of an object based on data received from the Lidar sensor, recognize a type and height of the object based on the X-axis values and the Y-axis values of the object, obtain Z-axis values corresponding to the X-axis values and the Y-axis values of the object, respectively, obtain a minimum value and a maximum value among the Z-axis values, obtain a reference value corresponding to the minimum value, determine an actual value of a ground height of the object based on the minimum value, the maximum value, the reference value of the Z-axis, and the height of the object, and generate a three-dimensional box for the object based on the determined actual value of the ground height of the object, and a controller configured to control autonomous driving or collision warning based on image information obtained by the camera and the determined actual value of the ground height of the object.

The object recognition apparatus may generate a ground trend line using a multiple linear regression model for the maximum value among the Z-axis values of a plurality of the objects and obtain the reference value using the generated ground trend line.

The object recognition apparatus may obtain a first difference value between the maximum value and the minimum value of the ground height of the object, obtain a second difference value between the maximum value and the reference value of the ground height of the object, and determine the actual value of the ground height of the first object based on whether the first difference value and the height of the object are the same and whether the second difference value and the height of the object are the same.

The object recognition apparatus may determine the actual value of the ground height of the object as the reference value of the ground height of the object when the first difference value and the height of the object are different and the second difference value and the height of the object are the same and may subtract the height of the object from the maximum value and determine the subtracted value as the actual value of the ground height of the object when the first difference value and the height of the object are different, the second difference value and the height of the object are different, and the maximum value and the reference value are the same.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
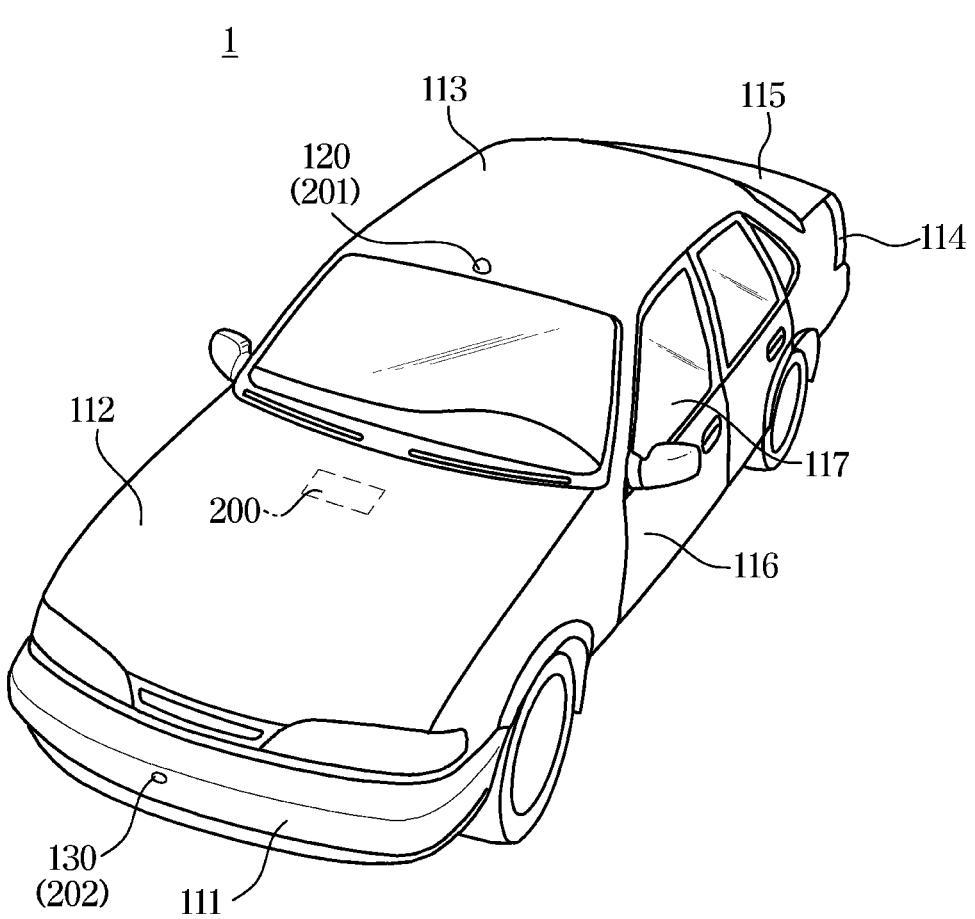
FIG. 1 is an exemplary view of an exterior of a vehicle provided with an object recognition apparatus according to an embodiment.

Throughout the specification, like reference numerals refer to like elements. This specification does not describe all factors of embodiments, and duplicative contents between general contents or embodiments in the technical field of the disclosure will be omitted. The terms 'member,' module; and 'device' used in this specification may be embodied as software or hardware, and it is also possible for a plurality of 'members,' modules; and 'devices' to be embodied as one component, or one 'member,' module; and 'device' to include a plurality of components according to the embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, a principle of action and embodiments of the disclosure will be described with reference to the accompanying drawings.

FIG. 1 is an exemplary view of an exterior of a vehicle provided with an object recognition apparatus according to an embodiment.

A vehicle 1 includes a body having an interior and an exterior and a chassis in which mechanical devices necessary for driving are installed as the remaining parts except for the body.

The exterior of the body includes a front panel 111, a bonnet 112, a roof panel 113, a rear panel 114, a tailgate 115, front left and right and rear left and right doors 116, and window glasses 117 provided on the doors 116 to be able to be opened and closed.

The vehicle 1 may further include an object detector 120 for detecting surrounding objects in front, rear, left, and right directions, an image obtainer 130 for detecting at least one image in the front, rear, left, and right directions, a wheel speed detector for detecting speeds of front, rear, left, and right wheels, an acceleration detector for detecting an acceleration of the vehicle, and an angular velocity detector for detecting a steering angle of the vehicle.

The object detector 120 detects the presence or absence of an object around the vehicle 1 and a location of the object. The location of the object may include a relative distance with respect to the vehicle 1 and a relative direction with respect to the vehicle 1.

The object detector 120 may be provided on at least one of the front panel in, the bonnet 112, the roof panel 113, the rear panel 114, and the tailgate 115.

The object detector 120 may include a radar sensor, a light detection and ranging (Lidar) sensor, or an ultrasonic sensor.

For example, the Lidar sensor may be provided on the roof panel 113.

The radar sensor may be provided on the front panel in and the rear panel 114.

The image obtainer 130 is a camera, which may include a CCD or CMOS image sensor and may include a 3D spatial recognition sensor such as a KINECT (RGB-D sensor), a TOF (structured light sensor), and a stereo camera.

The image obtainer 130 may be provided on at least one of the front panel in, the bonnet 112, the rear panel 114, and the tailgate 115.

For example, the image obtainer 130 for obtaining a front image of the vehicle may be provided on a front windshield glass inside the vehicle, may be provided on a rearview mirror inside the vehicle, or may be provided to be exposed to the outside on the roof panel 113.

The vehicle 1 may further include an object recognition apparatus 200 for recognizing surrounding objects and may control autonomous driving or collision warning based on object information recognized by the object recognition apparatus 200.

The object recognition apparatus 200 may include a Lidar sensor and may further include a camera.

The object recognition apparatus 200 may also perform communication with a Lidar sensor and a camera provided in the vehicle 1.

The object recognition apparatus 200 may recognize a type, location, size, and angle of an object around the vehicle 1 based on detection information detected by the Lidar sensor.

The object recognition apparatus 200 may also recognize a type, location, size, and angle of an object around the vehicle 1 based on detection information detected by the Lidar sensor and image information obtained by the camera.

The location of the object, which is a relative location with respect to the vehicle 1, includes an X-axis value and a Y-axis value based on a position of the Lidar sensor of the vehicle 1 and includes a Z-axis value with respect to a ground.

The size of the object may include a horizontal length (width), a vertical length (length), and a height. The angle of the object may be a yaw angle.

The horizontal length (width) may be recognized by the X-axis value, and the vertical length (length) may be recognized by the Y-axis value.

The height of an object may be recognized by the type of the object.

The yaw angle of the object may be a relative rotation angle with respect to the vehicle 1.

Figure 2:
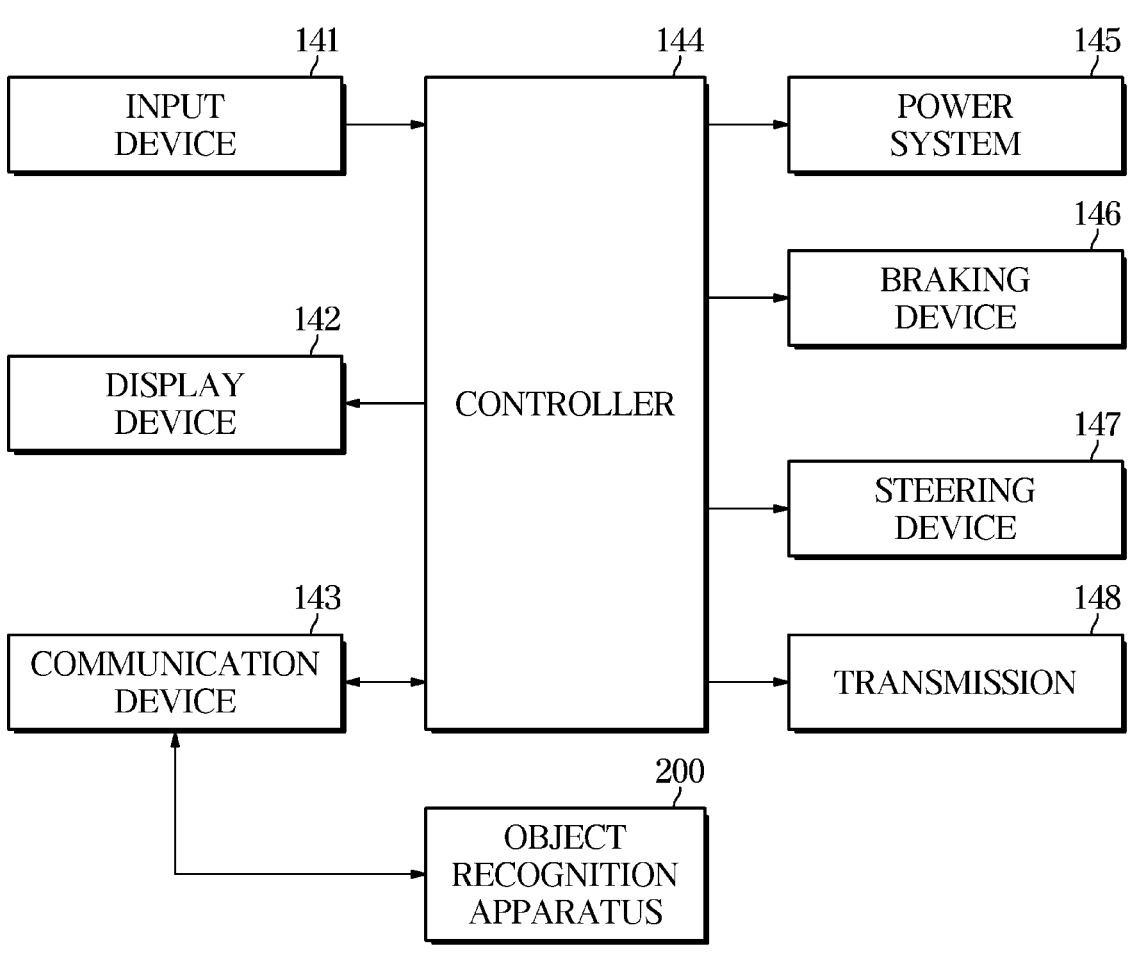
FIG. 2 is a control configuration diagram of the vehicle provided with the object recognition apparatus according to an embodiment.

FIG. 2 is a control configuration diagram of the vehicle provided with the object recognition apparatus according to an embodiment.

Hereinafter, an object recognition apparatus provided with a Lidar sensor and a camera will be described as an example.

The vehicle 1 includes an input device 141, a display device 142, a communication device 143, a controller 144, a power system 145, a braking device 146, a steering device 147, a transmission 148, and the object recognition apparatus 200.

The input device 141 receives a user input.

The input device 141 may receive any one of a manual driving mode of driving in response to a driving intention of a user and an autonomous driving mode of autonomously driving to a destination through object recognition.

The input device 141 may receive an on/off command in a collision warning mode.

The input device 141 may receive information of a destination in response to the autonomous driving mode or a navigation mode and may receive a selection command of any one of the searched routes.

The input device 141 may be provided on a center fascia and a head unit provided in the interior of the body of the vehicle 1 or may be provided on a steering wheel.

The input device 141 may include a hardware device such as various buttons or switches, a pedal, a keyboard, a mouse, a track-ball, various levers, a handle, and a stick.

The input device 141 may also include a graphical user interface (GUI) such as a touch pad, that is, a software device. The touch pad may be implemented as a touch screen panel (TSP) to form a layer structure together with the display device 142.

The display device 142 displays operation information on a function being performed in the vehicle 1.

The display device 142 may display current location information, destination information, and route information.

The display device 142 may display the driving mode which is currently executing, may display location information of the surrounding obstacles (i.e., objects), and may output collision warning information.

The display device 142 may be provided on at least one of the center fascia and the head unit provided on the interior of the body of the vehicle 1 or may be provided on a cluster.

The display device 142 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel, or an organic light emitting diode (OLED) panel, but is not limited thereto.

The communication device 143 may include one or more components that enable communication with an internal device and an external device of the vehicle 1 and may include, for example, at least one of a short-range communication module, a wired communication module, and a wireless communication module. The external device may be another vehicle, a server, and road infrastructure.

The short-range communication module may include various short-range communication modules that transmit and receive signals using a wireless communication network in a short distance such as a Bluetooth module, an infrared communication module, a radio frequency identification (RFID) communication module, a near field communication (NFC) module, and a Zigbee communication module.

The wired communication module may include various cable communication modules such as a universal serial bus (USB), a high definition multimedia interface (HDMI), a digital visual interface (DVI), a recommended standard 232 (RS-232), a power line communication, and a plain old telephone service (POTS), as well as various wired communication modules such as a controller area network (CAN) communication module, a local area network (LAN) module, a wide area network (WAN) module, and a value added network (VAN) module.

The wireless communication module, in addition to a Wi-Fi module and a wireless broadband module, may include wireless communication modules that support various wireless communication methods such as a global system for mobile communication (GSM), a code division multiple access (CDMA), a wideband code division multiple access (WCDMA), a universal mobile telecommunication system (UMTS), a time division multiple access (TDMA), and long term evolution (LTE).

The communication device 143 may further include a location receiver provided to receive a location signal for a current location of the vehicle 1.

The communication device 143 may perform communication between the object recognition apparatus 200 and the controller 144.

The controller 144 may control at least one of the display device 142, the power system 145, the braking device 146, the steering device 147, and the transmission 148 in response to the user input received by the input device 141.

In the autonomous driving mode, the controller 144 may check current location information and destination information, search for a route from the current location to the destination based on the checked current location information and destination information, and control autonomous driving based on the searched route.

The controller 144 may recognize a road environment by the vehicle itself based on object information recognized by the object recognition apparatus 200 while performing the autonomous driving mode, determine driving situations of objects, generate a driving route based on the object information, and control the driving of the vehicle 1 according to the generated driving route, thereby allowing the vehicle 1 to automatically travel to the destination.

The controller 144 may generate a driving route based on 3D object information while performing the autonomous driving mode, determine any one of a plurality of objects as a target object, and control to track the target object.

The controller 144 may determine a possibility of collision with an obstacle based on the object information recognized by the object recognition apparatus 200 while performing the collision warning mode and may control the display device 142 or a speaker to output collision warning information when it is determined that there is the possibility of a collision with the obstacle.

The controller 144 may control automatic emergency braking (AEB) based on the object information recognized by the object recognition apparatus 200 and may control blind spot detection (BSD), etc., based on the object information recognized by the object recognition apparatus 200.

The power system 145 generates power required for driving the vehicle 1.

The power system 145 may include an engine. The power system 145 may include an engine and a driving motor. The power system 145 may include a battery and a driving motor.

For example, the power system 145 may control the engine in response to an acceleration intention of the user through an accelerator pedal or a control command from the controller 144.

The braking device 146 generates a braking force of the vehicle 1.

The braking device 146 may slow the vehicle 1 or stop the vehicle 1 through friction with the wheels.

The braking device 146 may control a hydraulic device or a braking motor in response to a braking intention of the user through a braking pedal and/or a slip of the wheels. For example, the braking device 146 may temporarily release braking of the wheels in response to a slip of the wheels detected during braking of the vehicle 1 (anti-lock braking systems; ABS).

The braking device 146 may selectively release braking of the wheels in response to oversteering and/or understeering detected when the vehicle 1 is steered (electronic stability control; ESC).

The braking device 146 may also temporarily brake the wheels in response to slippage of the wheels detected when the vehicle 1 is driven (traction control system; TCS).

The steering device 147 changes a driving direction of the vehicle 1.

The steering device 147 may be an electronic steering device that allows the user to easily manipulate the steering wheel in response to a steering intention of the user through the steering wheel. For example, the electronic steering device may reduce a steering force when driving at a low speed or parking and increase the steering force when driving at a high speed.

The vehicle 1 may further include the transmission 148.

The transmission 148 may adjust a shift ratio from the engine to the wheels in response to a shift command from the user through a shift lever (also referred to as a gear lever, shifting lever, or gear shift), and/or a driving speed of the vehicle 1.

The transmission 148 may perform a drive mode, a reverse mode, a parking mode, and a neutral mode in response to a user input through the shift lever.

The power system 145, the braking device 146, the steering device 147, and the transmission 148 may include electronic control units (ECUs) for power control, braking control, steering control, and shift control, respectively, and each of the electronic control units may perform communication with the controller 144.

The vehicle 1 may include an ultrasonic sensor or a radar sensor.

The ultrasonic sensor generates ultrasonic waves for a predetermined time and then detects a signal reflected from an object and returned.

The ultrasonic sensor may be used to determine the presence or absence of an obstacle such as a pedestrian within a short range.

The radar sensor is a device that detects a location of an object by using reflected waves generated by the radiation of radio waves when transmitting and receiving in the same place.

The radar sensor may use the Doppler Effect, change a frequency of a transmitted wave over time, or output a pulse wave as the transmitted wave in order to prevent difficulty in distinguishing a received radio wave due to overlapping of the transmitted radio wave and the received radio wave.

When the ultrasonic sensor is provided in the vehicle 1, the controller 144 may detect a distance to an object based on a time difference between an ultrasonic wave generation time and an ultrasonic detection time.

When the radar sensor is provided in the vehicle 1, the controller 144 may detect a distance of an object by detecting a reflected wave when a radio wave of the radar sensor collides with the object and is reflected.

The object recognition apparatus 200 may recognize an object around the vehicle 1 and transmit object information on the recognized object to the controller 144.

For example, the object may include a preceding vehicle traveling in front of the vehicle 1, a structure (a curb, guard rail, tree, street light, traffic sign, traffic light, bump, etc.) installed around a road, an oncoming vehicle approaching from the opposite lane, a pedestrian, or a cyclist.

The object recognition apparatus 200 may transmit object information to the controller 144 through the communication device 143.

The object recognition apparatus 200 may also directly transmit the recognized object information to the controller 144.

The object recognition apparatus 200 may include an auxiliary communication device (not shown) and may transmit object information to the controller 144 through communication with the auxiliary communication device and the communication device 143 that is provided in the vehicle 1.

The object recognition apparatus 200 and the controller 144 may communicate with each other through a vehicle communication network (NT). For example, the object recognition apparatus 200 and the controller 144 may transmit and receive data through an Ethernet, a media oriented systems transport (MOST), Flexray, a controller area network (CAN), a local interconnect network (LIN), and the like.

The object recognition apparatus 200 may recognize a type, location, size, and angle of an object around the vehicle 1 based on data of the Lidar sensor.

The object recognition apparatus 200 may also recognize a type, location, size, and angle of an object around the vehicle 1 based on data of the Lidar sensor and image information obtained by the camera.

The location of the object, which is a relative location with respect to the vehicle 1, includes the X-axis value and the Y-axis value based on the position of the Lidar sensor 201 of the vehicle 1 and includes the Z-axis value with respect to the ground.

The object recognition apparatus 200 may generate a three-dimensional box on the object by checking the height corresponding to the type of the object and using a checked height H, the X-axis value, the Y-axis value, and the Z-axis value.

The object recognition apparatus 200 may further use a horizontal length (W), a vertical length (L), and an angle (Yaw) of the object when generating a 3D box of the object.

The object recognition apparatus 200 may transmit 3D box information on the generated 3D box to the controller 144.

Figure 3:
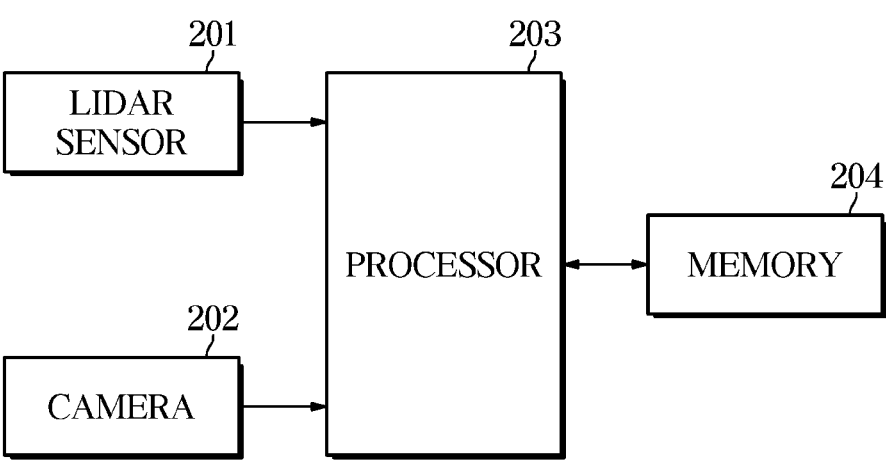
FIG. 3 is a control configuration diagram of the object recognition apparatus according to an embodiment.

As illustrated in FIG. 3, the object recognition apparatus 200 includes a Lidar sensor 201, a camera 202, a processor 203, and a memory 204.

The Lidar (light detection and ranging) sensor 201 is a non-contact distance detection sensor using a laser radar principle.

The Lidar sensor 201 may include a transmitter to transmit a laser and a receiver to receive the laser that is reflected from a surface of an object existing within a sensor range and returned.

The Lidar sensor 201 outputs a laser for detecting objects to the front, rear, left, and right of the vehicle 1 at a current location of the vehicle 1, receives the laser that is reflected from the surface of the object and returned, checks a reception time of the received laser, and transmits the laser reception time and a laser transmission time to the processor 203 as data.

The camera 202, which is a device for detecting surrounding object information and converting the information into an electrical image signal, may detect object information on an environment outside the vehicle 1 at the current location of the vehicle 1, in particular, object information on a road on which the vehicle 1 travels and on the front, rear, left, and right sides of the vehicle 1 in its surroundings, and may transmit an image signal of the detected object information to the processor 203 of the object recognition apparatus 200.

The camera 202 may include a front camera to obtain an image in front of the vehicle 1 and may include a left camera and a right camera to obtain images to the left and right sides of the vehicle 1 and a rear camera to obtain an image to the rear of the vehicle 1.

The camera 202 may include a rotatable camera.

The camera 202 may obtain image information on at least one of other vehicles, pedestrians, cyclists, lanes, curbs, guard rails, trees, and street lights located around the vehicle 1.

The processor 203 may recognize locations and types of surrounding objects based on the image information obtained by the camera 202.

The types of objects may include other vehicles, pedestrians, cyclists, curbs, guardrails, trees, street lights, traffic lights, traffic signs, buildings, and lanes.

The processor 203 may recognize an underground road, a high-level road, an ascending road, and a descending road based on the image information obtained by the camera 202.

The processor 203 may also recognize whether at least one object is occluded, a pothole, and a puddle of water based on the image information obtained by the camera 202.

The processor 203 may also recognize an underground road, a high-level road, an ascending road, and a descending road based on current location information of the location receiver and map information stored in the memory 204.

The processor 203 may include an image signal processor to process image information of the camera 202 and/or a digital signal processor to process radar information of the Lidar sensor 201 and/or a micro control unit (MCU) to generate a braking signal and a steering signal.

The processor 203 may obtain data corresponding to transmission and reception times of the laser received from the Lidar sensor 201. The data may be distance data.

The processor 203 controls an operation of the Lidar sensor 201 to scan an object located close to the vehicle 1.

For example, the processor 203 controls the movement of the Lidar sensor 201 to rotate at a preset angle and controls an operation of the Lidar sensor 201 to transmit a laser at a preset period.

When controlling the movement of the Lidar sensor 201, the processor 203 may also control a long-distance left-right scan when a short-distance left-right scan is completed and may also control the short-distance left-right scan when the long-distance left-right scan is completed.

The short distance is a distance less than or equal to a first reference distance, and the long distance is a distance that exceeds the first reference distance and is less than or equal to a second reference distance. The first reference distance may be shorter than the second reference distance.

The processor 203 may also control the Lidar sensor 201 to rotate left and right while performing the short-distance and long-distance scans.

The processor 203 may obtain a distance for each rotation angle based on the transmission time and the reception time of a laser for each rotation angle transmitted from the Lidar sensor 201.

The distance for each rotation angle may be a distance from an object existing in a direction corresponding to each rotation angle of the Lidar sensor 201.

The directions corresponding to the rotation angles of the Lidar sensor 201 may be directions in which the laser is reflected, respectively.

The processor 203 may obtain point data of X-Y coordinates corresponding to the distance for each rotation angle of the Lidar sensor 201, cluster the obtained point data, recognize objects through the clustering, obtain shape information and location information of an object based on a direction, distance, and amount of points between the recognized objects, and recognize a type, location, angle, and size of the object based on the shape information and location information of the object. This will be described with reference to FIGS. 4A to 8.

Figure 4A:
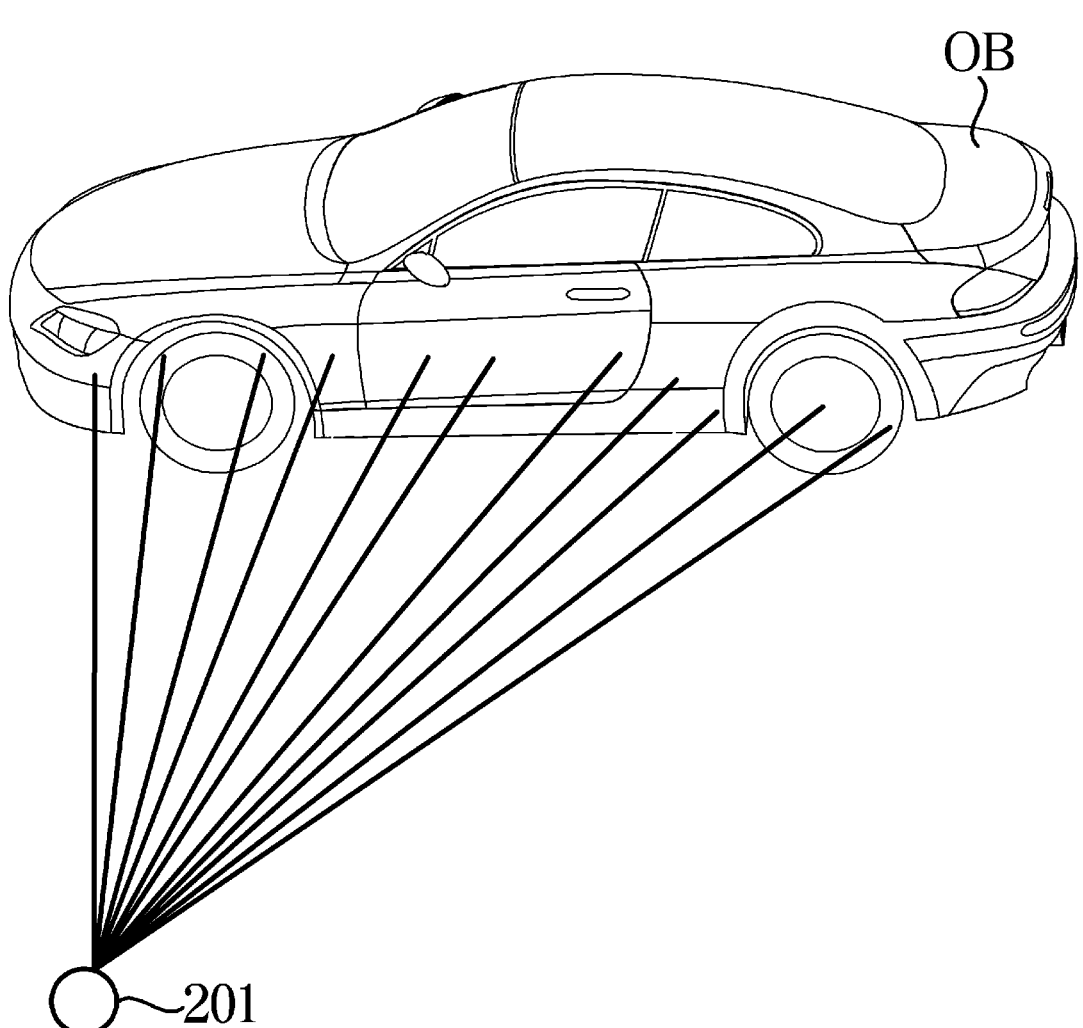
FIGS. 4A and 4B are exemplary diagrams of an operation of a Lidar sensor provided in the object recognition apparatus according to an embodiment.

As illustrated in FIG. 4A, the processor 203 controls the Lidar sensor 201 to transmit a laser in the front, rear, left, and right directions of the vehicle 1, that is, a total of 360 degrees. In this case, when an object OB exists in a laser transmission direction, the laser hits the object OB, and when the object OB does not exist, the laser proceeds in the laser transmission direction with straightness.

Figure 4B:
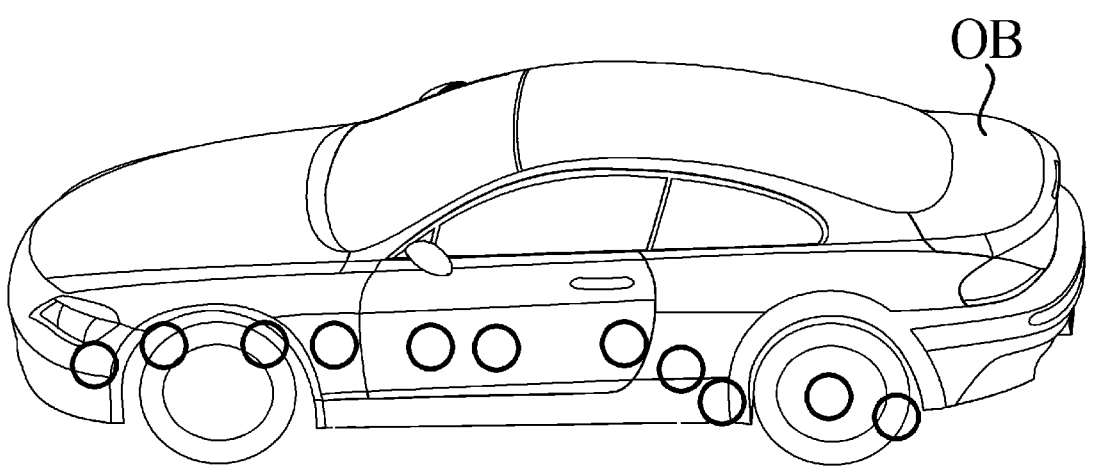

As illustrated in FIG. 4B, the Lidar sensor 201 may receive the laser reflected from the object OB existing at a position corresponding to the laser transmission direction.

The Lidar sensor 201 receives a laser reflected in at least one direction after transmitting the laser in a plurality of the transmission directions and receives the laser reflected from the surface of the object scanned by the Lidar sensor 201. In this case, the received laser may be obtained as point data corresponding to the reflected direction and distance.

Figure 5:
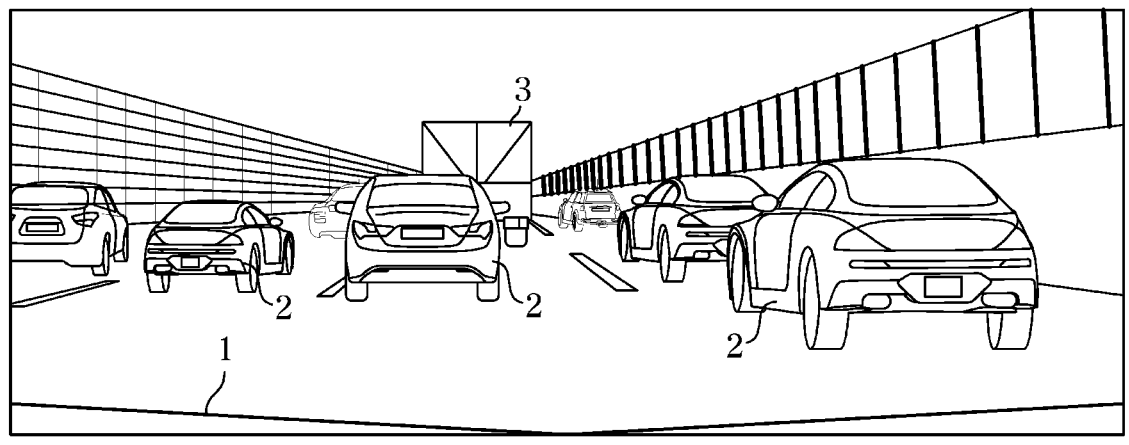
FIG. 5 is an exemplary diagram of driving of the vehicle provided with the object recognition apparatus according to an embodiment.

As illustrated in FIG. 5, it is assumed that the vehicle 1 is located in a third lane on a one-way 4-lane road, and objects exist in second, third, and fourth lanes. The objects may be other vehicles 2 and 3.

Figure 6:
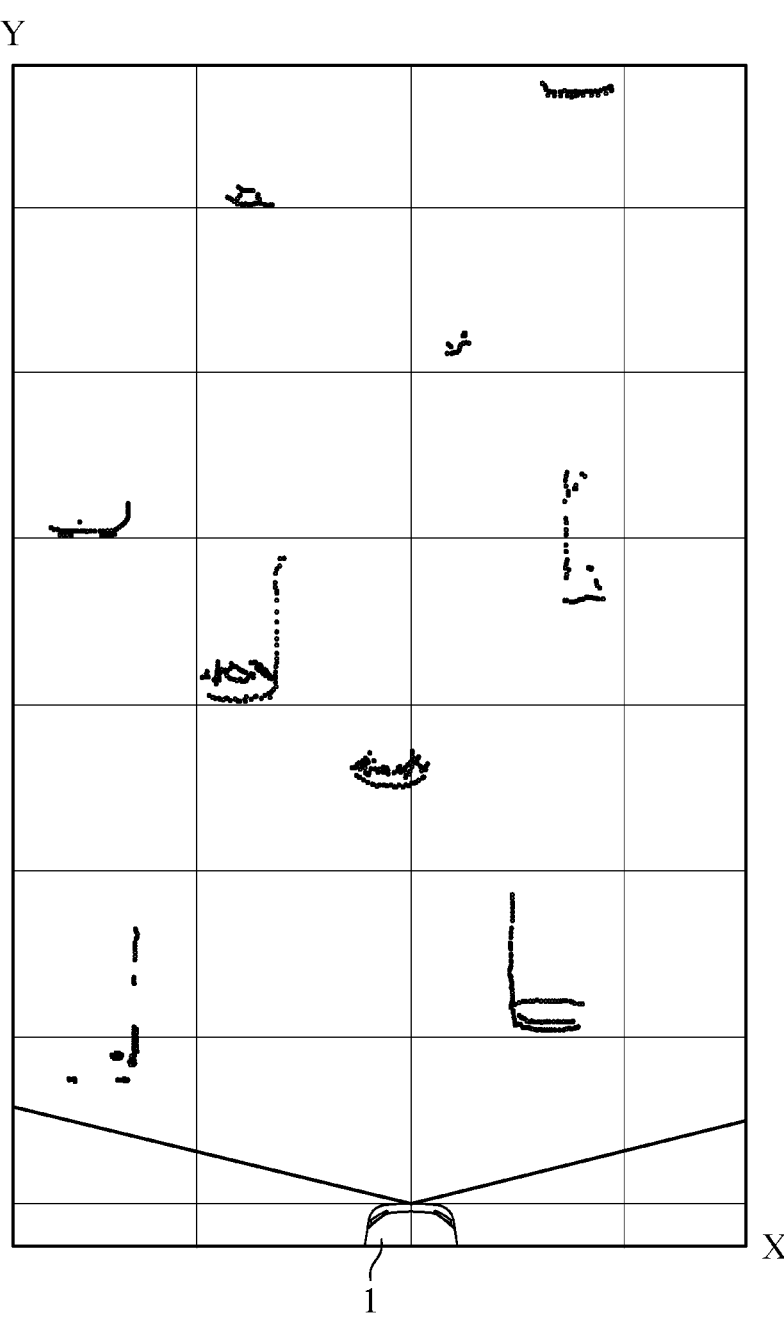
FIG. 6 is an exemplary diagram of point data obtained by the Lidar sensor provided in the object recognition apparatus according to an embodiment.

As illustrated in FIG. 6, when transmitting a laser, the Lidar sensor 201 may receive the laser reflected from the other vehicles 2 and 3 in the respective lanes. In this case, the processor 203 may obtain point data in the X-Y coordinates based on the received laser.

Figure 7:
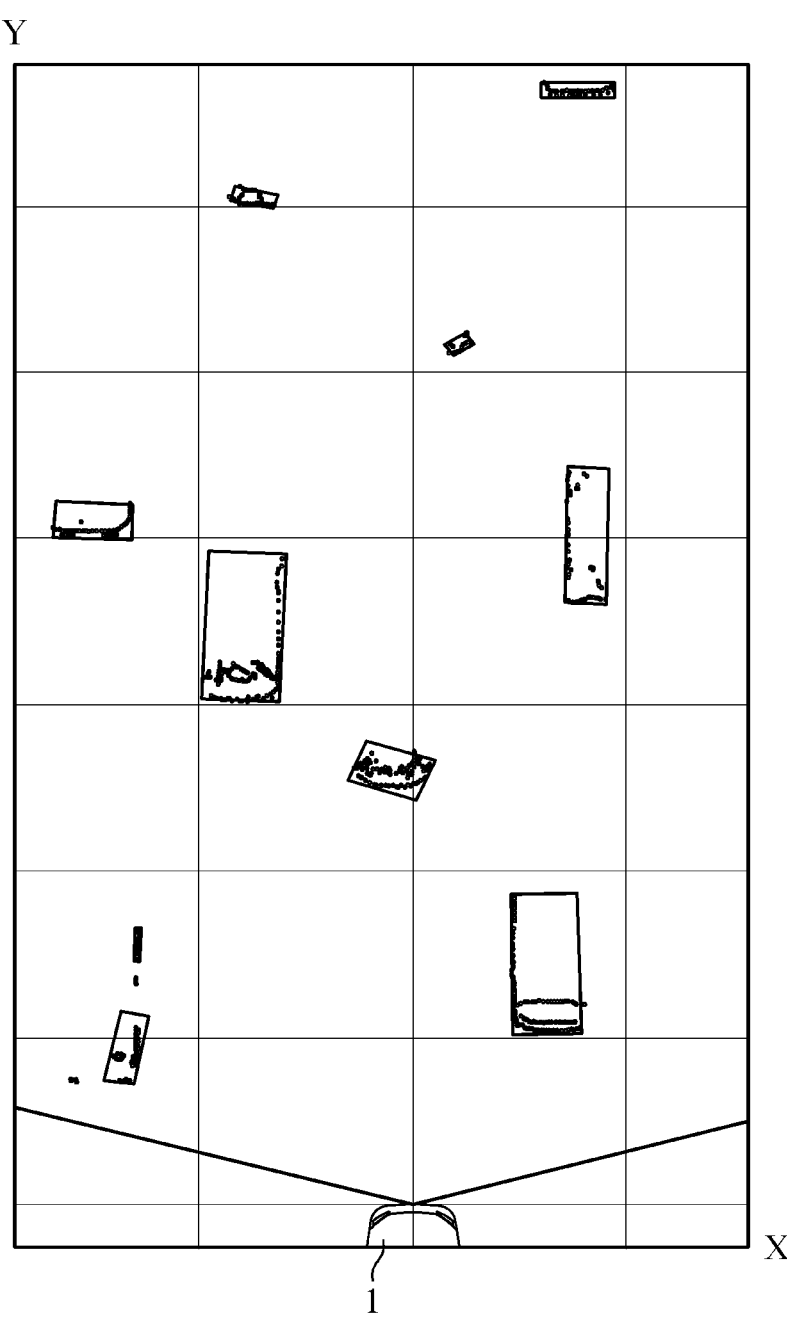
FIG. 7 is an exemplary diagram of clustering the point data illustrated in FIG. 6.

As illustrated in FIG. 7, the processor 203 clusters the point data in the X-Y coordinates. Clustering of point data includes connecting neighboring points based on the direction, distance, and amount of points between the vehicle 1 and the object.

Figure 8:
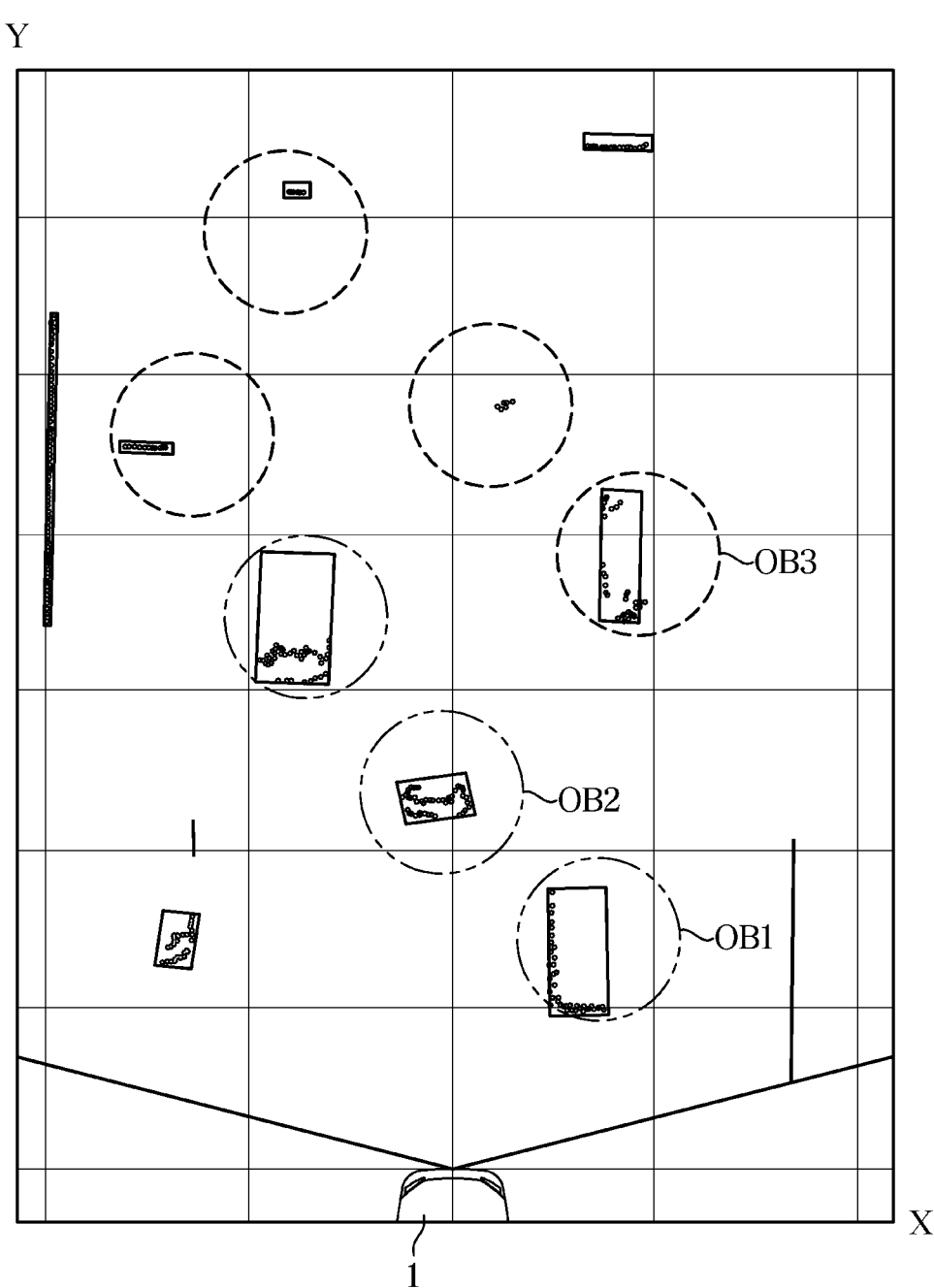
FIG. 8 is an exemplary diagram of recognizing objects from clusters illustrated in FIG. 7.

As illustrated in FIG. 8, the processor 203 may obtain shape information and location information of the other vehicles 2 and 3 located in each lane by clustering the point data and may recognize types, locations, angles, and sizes of the other vehicles 2 and 3 based on the obtained shape information and location information of the other vehicles 2 and 3.

The processor 203 may recognize the type of the other vehicle by comparing the shape information for each type stored in the memory 204 with the obtained shape information of the other vehicle.

The processor 203 may learn the obtained shape information of another vehicle and recognize a type of another vehicle based on a learning result.

The processor 203 may obtain shape information of another vehicle based on the image information obtained by the camera 202, learn shape information of another vehicle based on an image and shape information of another vehicle based on the Lidar sensor, and recognize the type of another vehicle based on the learning result.

When another vehicle whose body is partially obscured by the first other vehicle 2 is referred to as the second other vehicle 3, because a portion of the body of the second other vehicle 3 is obscured by the first other vehicle 2, the processor 203 may not recognize all surfaces of the body of the second other vehicle 3.

More specifically, this is because the Lidar sensor 201 transmits a laser having straightness and detects a shape and location of an object based on a signal of a reflected wave reflected from the object, so that when a portion of the second other vehicle 3 is obscured by the first other vehicle 2 located closest to the Lidar sensor 201, the Lidar sensor 201 may receive only the laser reflected from an exposed surface of the second other vehicle 3.

That is, because the Lidar sensor 201 may not transmit a laser to the obscured surface of the second other vehicle 3, the Lidar sensor 201 may not also receive the reflected laser. For this reason, the processor 203 may not recognize a portion of the surface of the second other vehicle 3 that is obscured by the first other vehicle 2.

In this case, the processor 203 may obtain shape information of the second other vehicle 3 obscured by the first other vehicle 2 based on the image information obtained by the camera 202 and recognize a type of the second other vehicle 3 based on the obtained shape information. In this case, the type of the second other vehicle 3 may include a passenger car, a bus, a truck, and the like.

The type of the second other vehicle 3 may include a large vehicle, a small vehicle, and a medium vehicle.

That is, the processor 203 may recognize a type of a second object obscured by a first object based on the image information obtained by the camera 202.

The processor 203 may learn shape information of an object to recognize a type of the object and may store the recognized type and shape information in the memory 204.

When learning the shape information of the object, the processor 203 may classify the object into a size, height, and type of the object to learn.

The processor 203 may recognize object information for each object in a first order based on data of the Lidar sensor 201. The object information for each object recognized in the first order may include a location (X-axis value and Y-axis value), size (W and L), angle (Yaw), and type (Class) for each object.

For example, when there are three objects, the processor 203 may recognize object information of a first object OB1, object information of a second object OB2, and object information of a third object OB3.

The object information of each object is as follows.

OB1→X1, Y1, W1, L1, Yaw1, Class1

OB2→X2, Y2, W2, L2, Yaw2, Class2

OB3→X3, Y3, W3, L3, Yaw3, Class3

The processor 203 recognizes heights corresponding to the types of objects recognized from height information for each type of objects stored in the memory 204, respectively.

The processor 203 may recognize object information for each object in a second order based on the type for each object. The object information for each object recognized in the second order may include the height H for each object.

For example, the object information for each object recognized in the second order is as follows.

OB1→X1, Y1, W1, L1, Yaw1, Class1, H1

OB2→X2, Y2, W2, L2, Yaw2, Class2, H2

OB3→X3, Y3, W3, L3, Yaw3, Class3, H3

The processor 203 may perform object recognition through a Lidar sensor 201 using a bird eye view (BEV) algorithm. In this case, the processor 203 may obtain a Z map (ground height map) in which Z values corresponding to X values and Y values are matched through the bird eye view (BEV) algorithm. The Z value may be a ground height value.

The processor 203 recognizes a minimum value and a maximum value among the Z values for each object based on the Z map.

Figure 9:
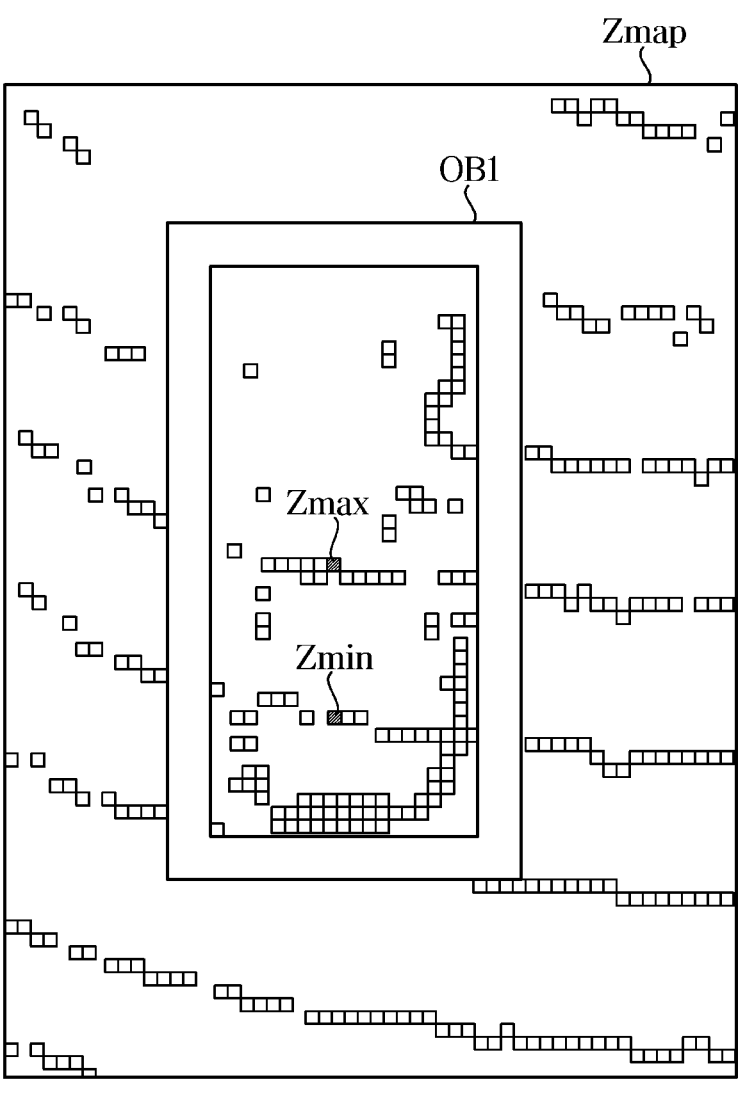
FIG. 9 is an exemplary diagram of recognizing a minimum value and a maximum value of a ground height of an object through the object recognition apparatus according to an embodiment.

As illustrated in FIG. 9, the processor 203 may recognize a minimum value Zmin and a maximum value Zmax among ground height values of the first object OB1 based on the Z map.

The processor 203 may recognize object information for each object in a third order based on the Z map. The object information for each object recognized in the third order may include the minimum value Zmin and the maximum value Zmax of the ground height. For example, the object information for each object recognized in the third order is as follows.

OB1→X1, Y1, W1, L1, Yaw1, Class1, H1, Zmax1, Zmin1

OB2→X2, Y2, W2, L2, Yaw2, Class2, H2, Zmax2, Zmin2

OB3→X3, Y3, W3, L3, Yaw3, Class3, H3, Zmax3, Zmin3

When a plurality of objects is recognized, the processor 203 may obtain a distance, that is, a longitudinal distance between each object and the vehicle 1, and may also determine a rank of the plurality of objects based on the distance order in the longitudinal direction.

The processor 203 may list the plurality of objects in order from the short distance to the long distance in a longitudinal direction, recognize the minimum values among ground height values of the objects, and recognize a reference value Zref of the ground height for each object by performing a multiple linear regression model for the minimum values of the ground heights of the plurality of objects.

Figure 10A:
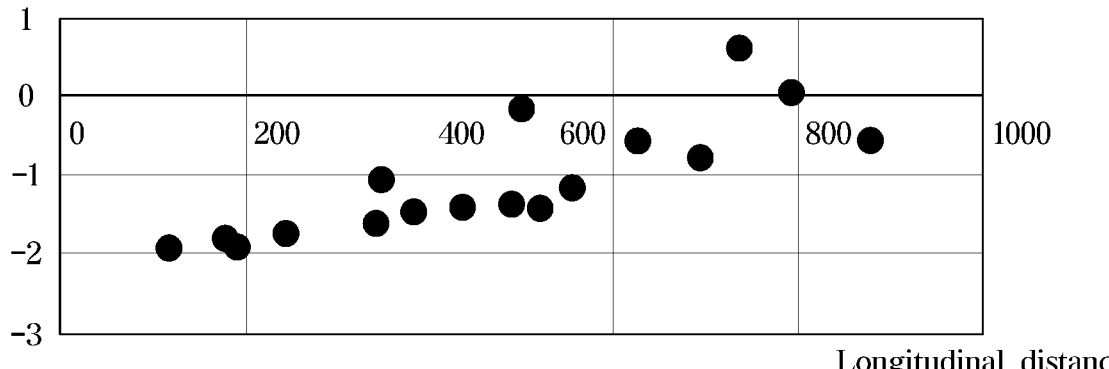
FIG. 10A is an exemplary diagram of graphing minimum values of ground heights of objects for each longitudinal distance through the object recognition apparatus according to an embodiment.

As illustrated in FIG. 10A, the processor 203 lists a plurality of objects in the order of the distance to the vehicle 1 in the longitudinal direction, recognizes the minimum value among the Z-axis values of the plurality of objects, and graphs the minimum values of the ground heights of the plurality of objects.

That is, in the graph, the minimum values of the ground heights of the plurality of objects are matched for each longitudinal distance from the vehicle 1.

Figure 10B:
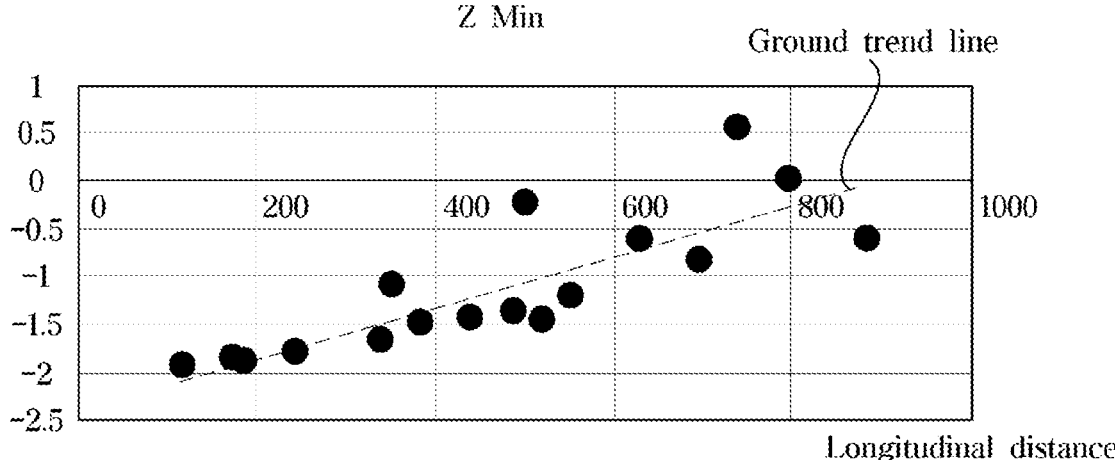
FIG. 10B is an exemplary diagram of recognizing a ground trend line through the object recognition apparatus according to an embodiment.

As illustrated in FIG. 10B, the processor 203 recognizes the reference value Zref of the ground height for each object through the multiple linear regression model for the minimum value of the ground height for each longitudinal distance in the graph.

The multiple linear regression model is a model that assumes that a relationship between a numeric explanatory variable X and a continuous numeric dependent variable Y is linear and estimates a regression coefficient capable of best expressing it from data.

The processor 203 may recognize object information for each object in a fourth order based on the multiple linear regression model. The object information for each object recognized in the fourth order may further include the reference value Zref of the ground height. For example, the object information for each object recognized in the fourth order is as follows.

OB1→X1, Y1, W1, L1, Yaw1, Class1, H1, Zmax1, Zmin1, Zref1

OB2→X2, Y2, W2, L2, Yaw2, Class2, H2, Zmax2, Zmin2, Zref2

OB3→X3, Y3, W3, L3, Yaw3, Class3, H3, Zmax3, Zmin3, Zref3

The processor 203 may recognize a height corresponding to the type of the object, obtain a first difference value based on the maximum value and the minimum value of the ground height, determine in the first order whether the first difference value and the recognized height are the same, obtain a second difference value based on the maximum value and the reference value of the ground height, determine in the second order whether the second difference value and the recognized height are the same, and recognize an object state based on determination results of the first and second orders.

$$Zmax-Zmin=H$$
$$Zmax-Zmin\neq H$$
$$Zmax-Zref=H$$
$$Zmax-Zref\neq H$$

The object state may include a normal recognition state, an abnormal recognition state, a high ground recognition state, a low ground recognition state, and a state of being out of the Z range.

The abnormal recognition state may include a state of being obscured by another object and a state in which the recognition is distorted by diffuse reflection of water.

The high ground recognition state is a state of being recognized on a ground in which the ground height is greater than a reference value by a predetermined value or more, and the low ground recognition state is a state of being recognized on a ground in which the ground height is less than the reference value by the predetermined value or less.

The high ground recognition state may include a state in which an object is recognized in a hill or the like, and the low ground recognition state may include a state in which an object entering an underpass is recognized.

The processor 203 may finally determine the ground height of the object based on the recognized object state. When the ground height of the object is finally determined, the processor 203 may finally recognize object information for each object. The finally recognized object information is as follows.

OB1→X1, Y1, Z1, W1, L1, H1, Yaw1, Class1
OB2→X2, Y2, Z2, W2, L2, H2, Yaw2, Class2
OB3→X3, Y3, Z3, W3, L3, H3, Yaw3, Class3
Z1 may be any one of Zmax1, Zmin1, and Zref1
Z2 may be any one of Zmax2, Zmin2, and Zref2
Z3 may be any one of Zmax3, Zmin3, and Zref3

The processor 203 may transmit the finally recognized object information to the controller 144.

The processor 203 recognizes objects in an image based on the image information obtained by the camera 202 and generates 3D boxes on the objects recognized in the image based on the object information recognized by the Lidar sensor 201.

That is, the processor 203 may overlap the 3D boxes on the objects in the image.

The processor 203 may also transmit 3D box information about the generated 3D boxes to the controller 144.

Hereinafter, an example of recognizing an object state based on the object height, the maximum value of the ground height, the minimum value of the ground height, and the reference value of the ground height and recognizing the final ground height based on the recognized object state will be described with reference to FIGS. 11A, 11B, 12A, 12B, 13A, 13B, 13C, 14A, 14B, 15A, 15B, 15C, 16A, 16B, 17A, and 17B.

Figure 11A:
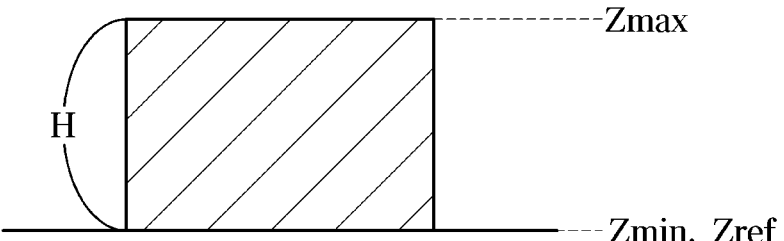
FIGS. 11A, 11B, 12A, 12B, 13A, 13B, 13C, 14A, 14B, 15A, 15B, 15C, 16A, 16B, 17A, and 17B are exemplary views of recognizing an object state and an actual value of a ground height through an object recognition apparatus according to an embodiment.

As illustrated in FIG. 11A, the processor 203 recognizes the type of the object OB, recognizes the height H corresponding to the recognized type, and recognizes the maximum value Zmax, the minimum value Zmin, and the reference value Zref of the ground height of the object OB.

When the first difference value between the maximum value and the minimum value of the ground height of the object is equal to or similar to the height of the object, and the second difference value between the maximum value and the reference value of the ground height is equal to or similar to the height of the object, the processor 203 may recognize the object state as the normal recognition state.

$$Zmax-Zmin=H, \quad Zmax-Zref=H\Rightarrow normal \ recognition \ state$$

The normal recognition state is a state in which an object is not obscured by another object and the object is normally recognized by the Lidar sensor 201 while existing on the ground.

That the first difference value and a height of an object are similar includes that an error between the first difference value and the height of the object is within a preset error range.

That the second difference value and a height of an object are similar includes that an error between the second difference value and the height of the object is within a preset error range.

The processor 203 determines the ground height of the object as a minimum value when the object state is recognized as the normal recognition state. In this case, the determined minimum value may be an actual value of the ground height of the object.

Figure 11B:
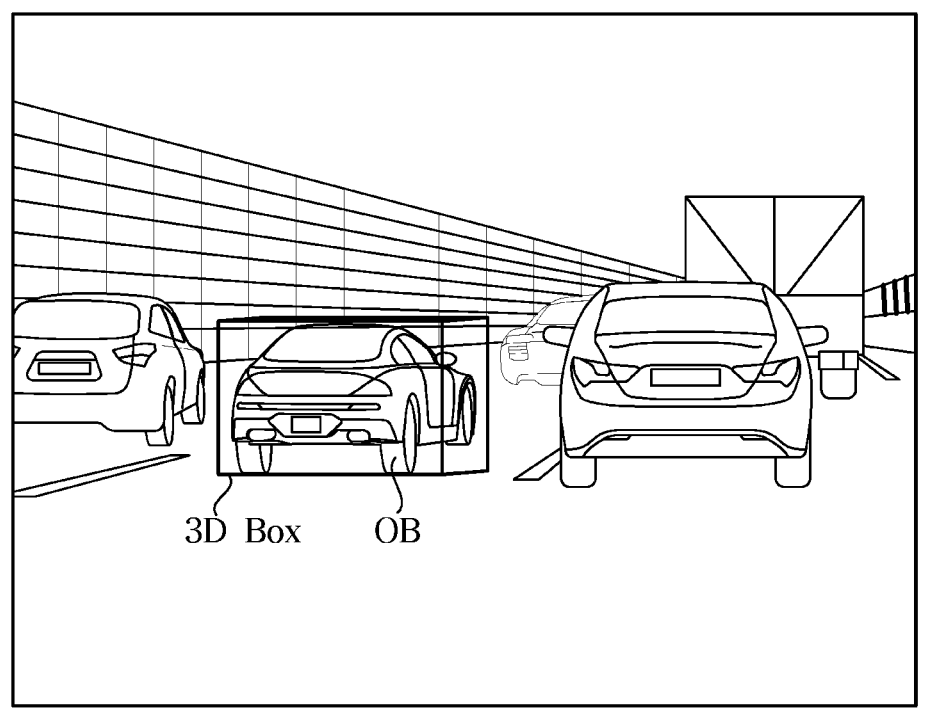

As illustrated in FIG. 11B, the processor 203 generates a 3D box with the ground height as the minimum value Zmin, but may generate a 3D box based on the location (X and Y), size (W and L), angle (Yaw), and height (H), and overlaps the generated 3D box on the object OB.

Figure 12A:
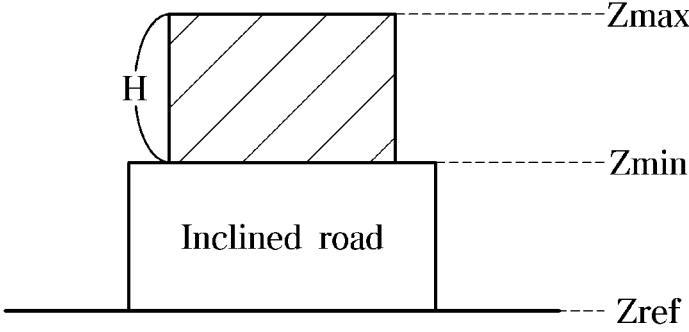

As illustrated in FIG. 12A, the processor 203 recognizes the type of the object OB, recognizes the height H corresponding to the recognized type, and recognizes the maximum value Zmax, the minimum value Zmin, and the reference value Zref of the ground height of the object OB.

When the first difference value between the maximum value and the minimum value of the ground height of the object is equal to or similar to the height of the object, and the second difference value between the maximum value and the reference value of the ground height is different from the height of the object, the processor 203 may determine the object state as the high ground recognition state.

$$Zmax-Zmin=H, \quad Zmax-Zref\neq H\Rightarrow high \ ground \ recognition \ state$$

That the minimum value of the ground height of the object OB is greater than the reference value means that the object is located at a high place.

The high ground recognition state is a state in which an object is not obscured by another object and is located on a high ground such as a hill.

That the second difference value and a height of an object are different includes that an error between the second difference value and the height of the object is out of the preset error range.

The processor 203 determines the ground height of the object as a minimum value when the object state is recognized as the high ground recognition state. In this case, the determined minimum value may be the actual value of the ground height of the object.

Figure 12B:
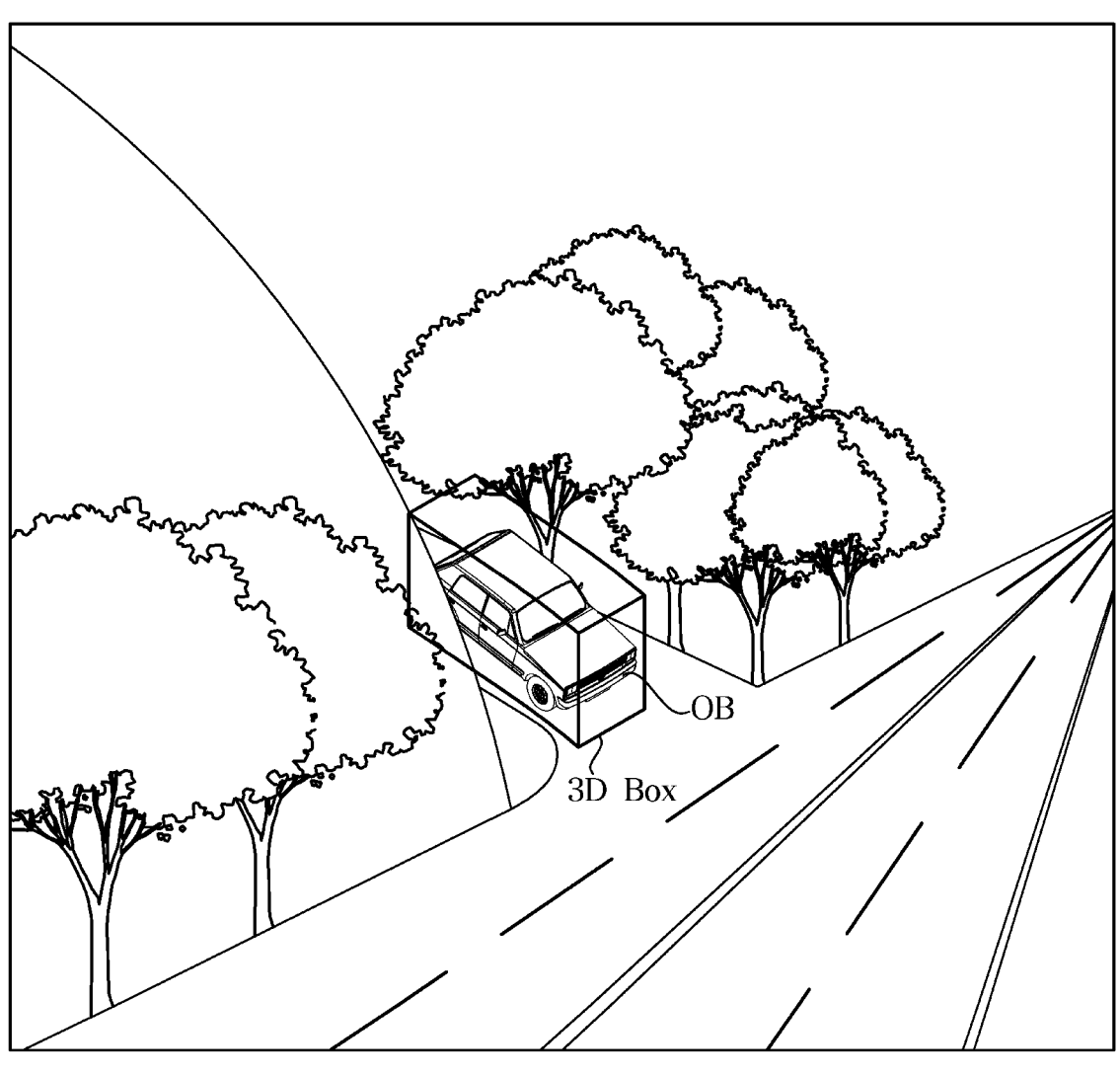

As illustrated in FIG. 12B, the processor 203 generates a 3D box with the ground height as the minimum value Zmin, but may generate a 3D box based on the location (X and Y), size (W and L), angle (Yaw), and height (H), and overlaps the generated 3D box on the object OB.

Figure 13A:
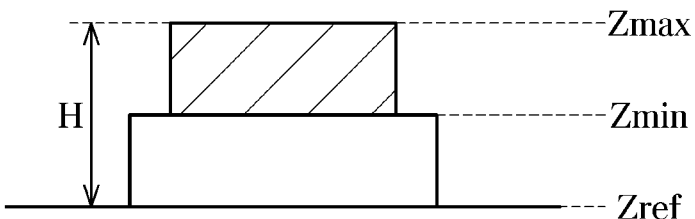

As illustrated in FIG. 13A, the processor 203 recognizes the type of the object OB, recognizes the height H corresponding to the recognized type, and recognizes the maximum value Zmax, the minimum value Zmin, and the reference value Zref of the ground height of the object OB.

When the first difference value between the maximum value and the minimum value of the ground height of the object is different from the height of the object, and the second difference value between the maximum value and the reference value of the ground height is equal to or similar to the height of the object, the processor 203 may recognize the object state as the abnormal recognition state.

Zmax−Zmin≠H, Zmax−Zref=H=>abnormal recognition state

That the second difference value is equal to or similar to the height of the object means that a portion of the object OB is obscured by another object and the remaining portion is not recognized.

That the first difference value and a height of an object are different includes that an error between the first difference value and the height of the object is out of the preset error range.

The processor 203 may compare the reference value and the minimum value of the ground height when the object state is determined as the abnormal recognition state and may determine the object state as an obscured state when it is determined that the reference value of the ground height is less than the minimum value.

When the object state is recognized as the abnormal recognition state, the processor 203 may also determine whether a road state is a state in which diffuse reflection occurs such as in a puddle of water or a state of being obscured by another object based on the image information.

Figure 13B:
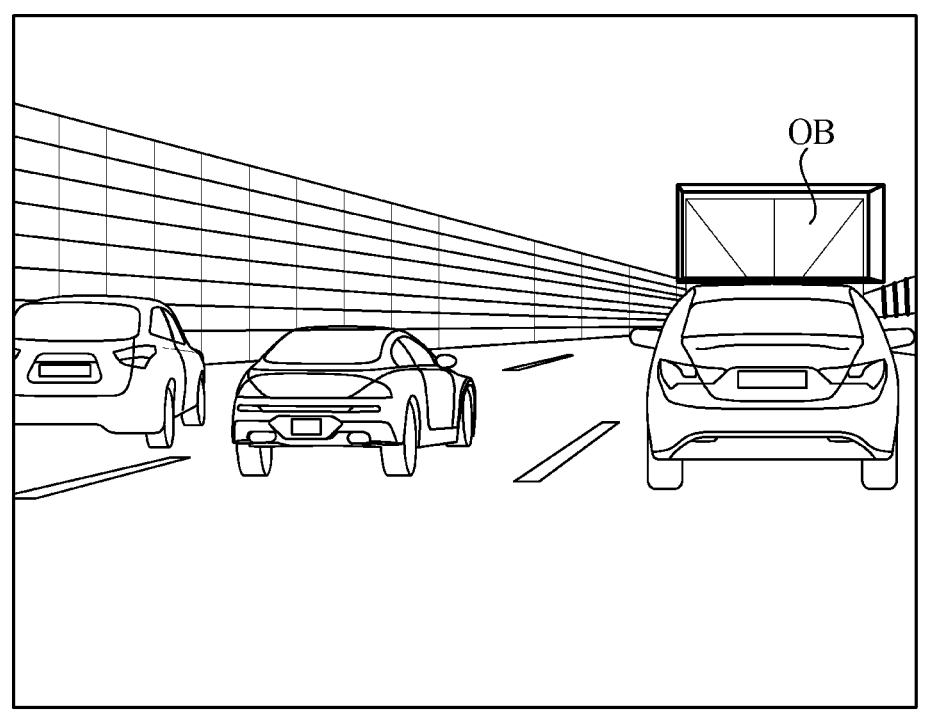

As illustrated in FIG. 13B, the processor 203 determines the ground height of the object as the reference value Zref when it is determined that the object OB is in the obscured state by another object. In this case, the determined reference value may be the actual value of the ground height of the object.

Figure 13C:
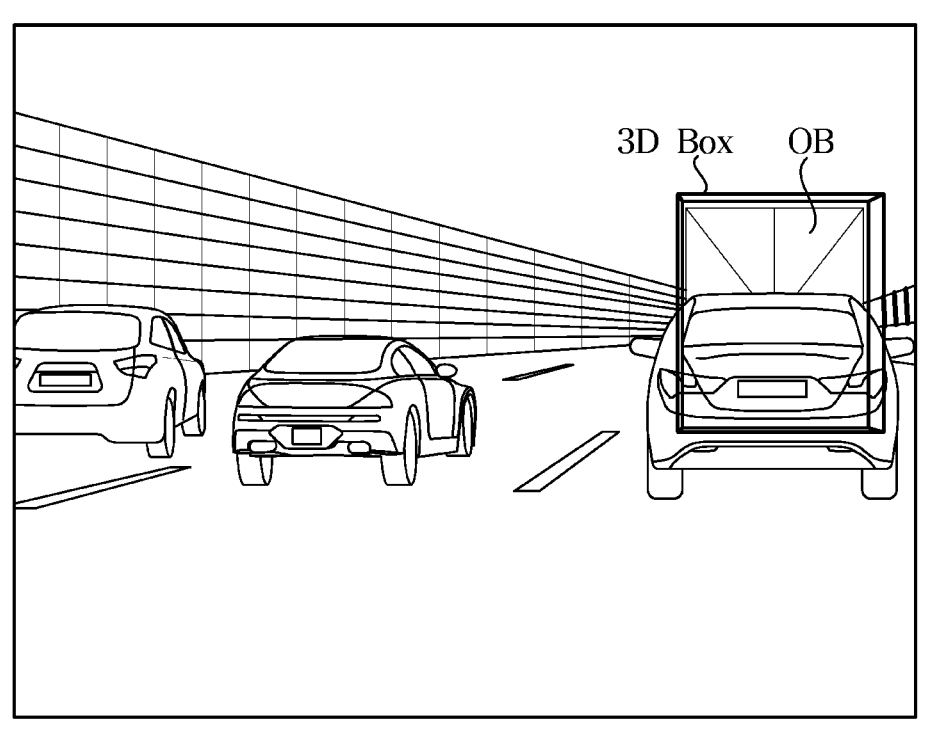

As illustrated in FIG. 13C, the processor 203 generates a 3D box with the ground height as the reference value Zref, but may generate a 3D box based on the location (X and Y), size (W and L), angle (Yaw), and height (H), and overlaps the generated 3D box on the object OB.

Figure 14A:
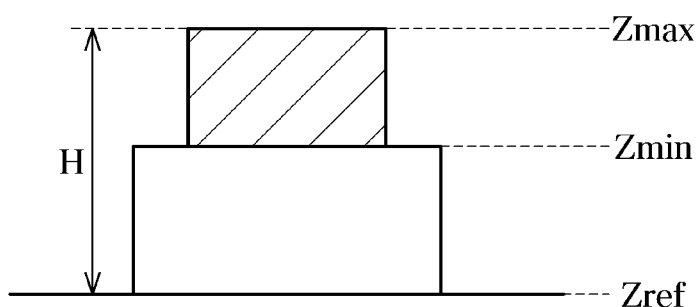

As illustrated in FIG. 14A, the processor 203 recognizes the type of the object OB, recognizes the height H corresponding to the recognized type, and recognizes the maximum value Zmax, the minimum value Zmin, and the reference value Zref of the ground height of the object OB. The object in FIG. 14A is a person, and the height of the object may be 1.7 m.

When the first difference value between the maximum value and the minimum value of the ground height of the object is different from the height of the object, and the second difference value between the maximum value and the reference value of the ground height is equal to or similar to the height of the object, the processor 203 may recognize the object state as the abnormal recognition state.

The processor 203 may compare the reference value and the minimum value of the ground height when the object state is determined as the abnormal recognition state and may determine the object state as the obscured state when it is determined that the reference value of the ground height is less than the minimum value.

The processor 203 may also determine whether the object is in the obscured state based on the image information when the object state is recognized as the abnormal recognition state.

The processor 203 determines the ground height of the object OB as the reference value Zref when it is determined that the object OB is obscured by another object. In this case, the determined reference value may be the actual value of the ground height of the object.

Figure 14B:
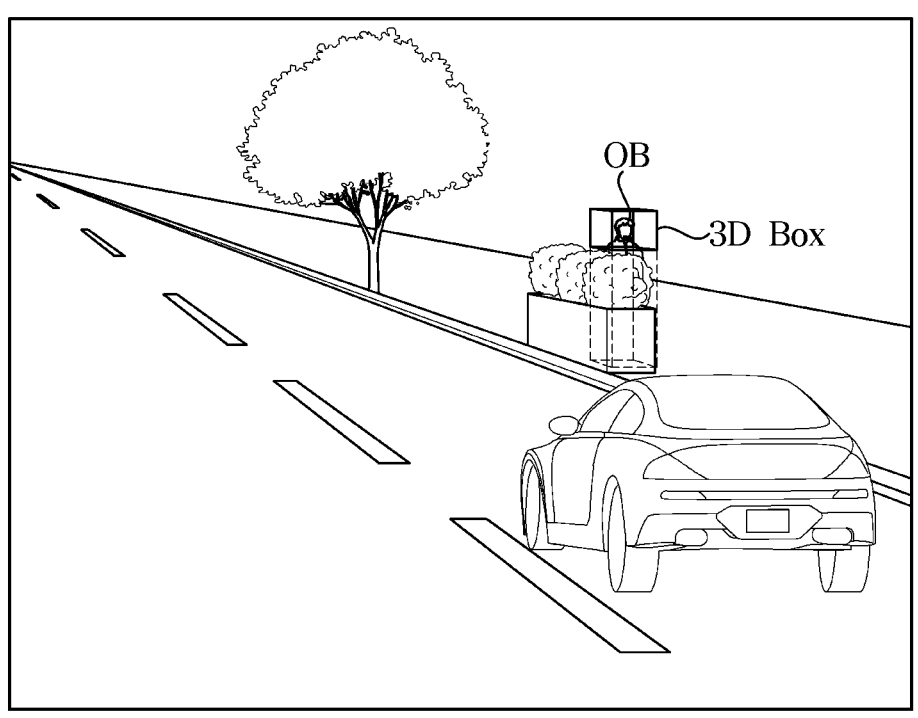

As illustrated in FIG. 14B, the processor 203 generates a 3D box with the ground height as the reference value Zref, but may generate a 3D box based on the location (X and Y), size (W and L), angle (Yaw), and height (H), and overlaps the generated 3D box on the object OB.

That is, the processor 203 may generate a 3D box having a height of a vehicle when the object is the vehicle and generate a 3D box having a height of a person when the object is the person.

Figure 15A:
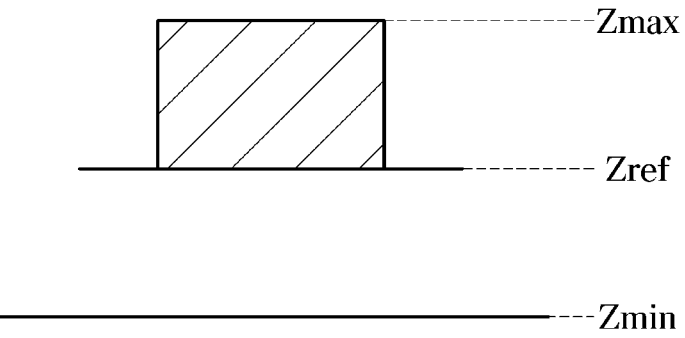

As illustrated in FIG. 15A, the processor 203 recognizes the type of the object OB, recognizes the height H corresponding to the recognized type, and recognizes the maximum value Zmax, the minimum value Zmin, and the reference value Zref of the ground height of the object OB.

When the first difference value between the maximum value and the minimum value of the ground height of the object is different from the height of the object, and the second difference value between the maximum value and the reference value of the ground height is equal to or similar to the height of the object, the processor 203 may determine the object state as the abnormal recognition state.

Zmax−Zmin≠H, Zmax−Zref=H=>abnormal recognition state

The processor 203 may compare the reference value and the minimum value of the ground height when the object state is determined as the abnormal recognition state and may determine the object state as a distorted state when it is determined that the reference value of the ground height is greater than the minimum value.

The processor 203 may determine whether the road state is a state in which diffuse reflection occurs such as in a puddle of water based on the image information when the object state is recognized as the abnormal recognition state and may determine the object state as the distorted state when it is determined that the road state is a state in which diffuse reflection occurs.

Figure 15B:
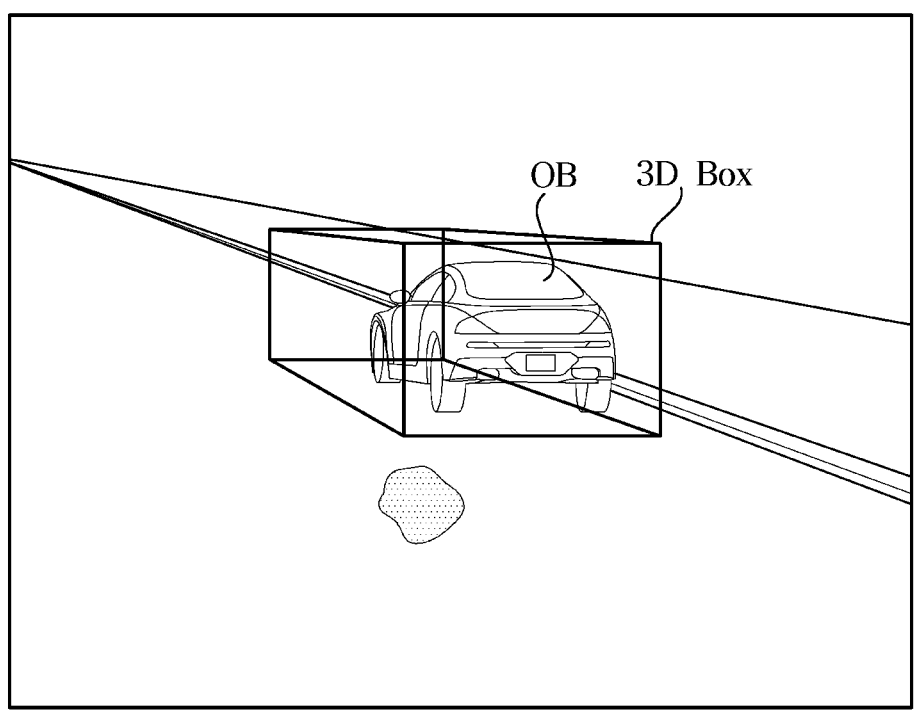

As illustrated in FIG. 15B, when it is determined that the distortion of recognition has occurred due to the diffuse reflection, the processor 203 determines the ground height of the object as the reference value Zref. In this case, the determined reference value may be the actual value of the ground height of the object.

Figure 15C:
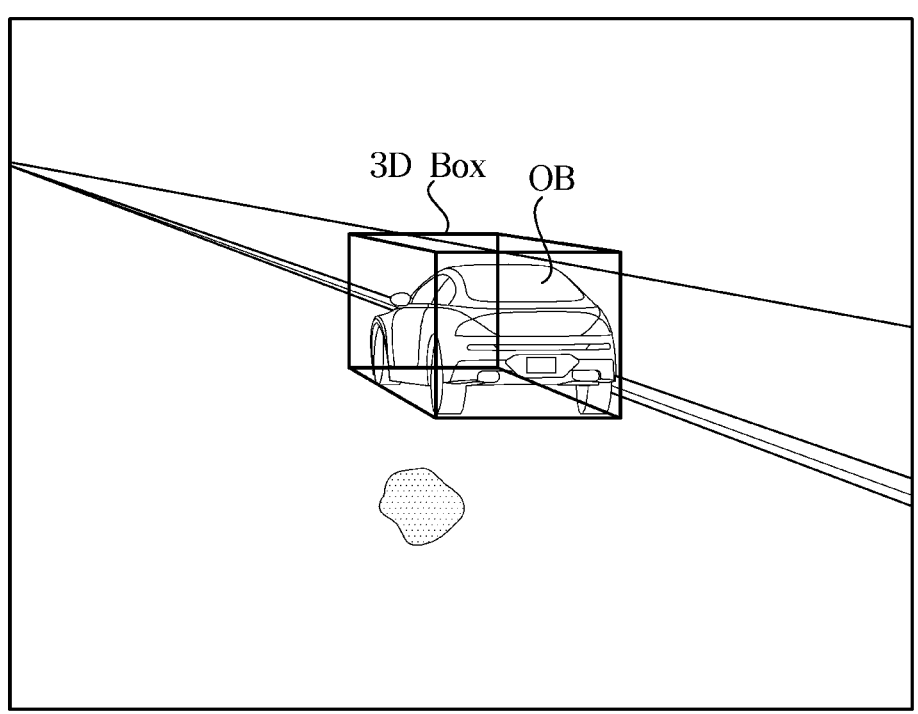

As illustrated in FIG. 15C, the processor 203 generates a 3D box with the ground height as the reference value Zref, but may generate a 3D box based on the location (X and Y), size (W and L), angle (Yaw), and height (H), and overlaps the generated 3D box on the object OB.

Figure 16A:
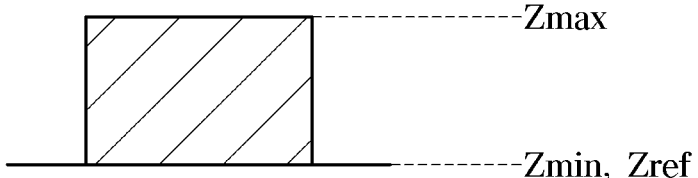

As illustrated in FIG. 16A, the processor 203 recognizes the type of the object OB, recognizes the height H corresponding to the recognized type, and recognizes the maximum value Zmax, the minimum value Zmin, and the reference value Zref of the ground height of the object OB.

When the first difference value between the maximum value and the minimum value of the ground height of the object is different from the height of the object, and the second difference value between the maximum value and the reference value of the ground height is different from the height of the object, the processor 203 may determine whether the object state is a second inclined state or a state of being out of a Z range.

Zmax−Zmin≠H, Zmax−Zref≠H=>inclined low ground state or state of being out of Z range The processor 203 may determine whether the minimum value of the ground height of the object OB is equal to or similar to the reference value and may determine the object state as the low ground recognition state when it is determined that the minimum value of the ground height of the object OB is equal to or similar to the reference value.

The processor 203 may also determine whether the object state is the low ground recognition state based on the image information.

Figure 16B:
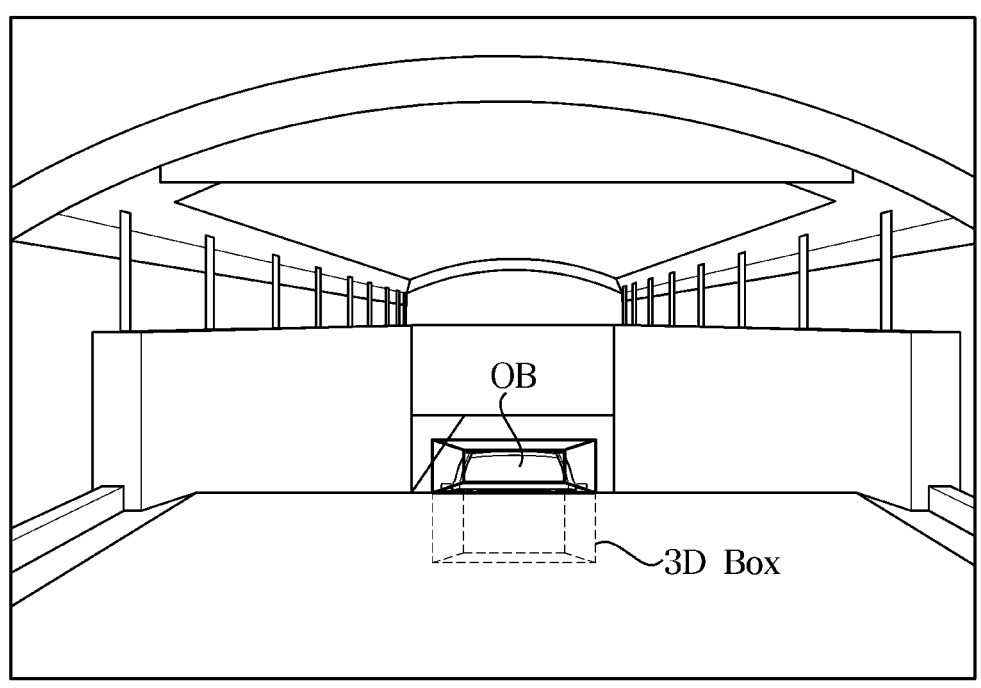

As illustrated in FIG. 16B, when the object state is recognized as the low ground recognition state, the processor 203 determines the ground height of the object as a value obtained by subtracting the height H from the maximum value Zmax (Zmax–H=Zfan). In this case, the value obtained by subtracting the height H from the maximum value Zmax may be the actual value of the ground height of the object.

The processor 203 generates a 3D box based on a final ground height Zfan, but may generate a 3D box based on the location (X and Y), size (W and L), angle (Yaw), and height (H), and overlaps the generated 3D box on the object OB.

Figure 17A:
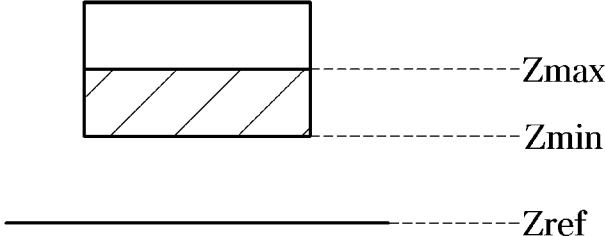

As illustrated in FIG. 17A, the processor 203 recognizes the type of the object OB, recognizes the height H corresponding to the recognized type, and recognizes the maximum value Zmax, the minimum value Zmin, and the reference value Zref of the ground height of the object OB.

When the first difference value between the maximum value and the minimum value of the ground height of the object is different from the height of the object, and the second difference value between the maximum value and the reference value of the ground height is different from the height of the object, the processor 203 may determine whether the object state is the second inclined state or the state of being out of the Z range.

$$Zmax–Zmin \neq H, \ Zmax–Zref \neq H \Rightarrow inclined \ low \ ground$$
state or state of being out of Z range The processor 203 may determine whether the minimum value of the ground height of the object OB is greater than the reference value and may determine the object state as the state of being out of the Z range when it is determined that the minimum value of the ground height of the object OB is greater than the reference value.

When it is determined that the object is in the state of not being obscured by another object, is in the state of being located on a high ground such as a hill, and is in the state of being out of the Z range, the processor 203 determines the ground height of the object as the minimum value. In this case, the determined minimum value may be the actual value of the ground height of the object.

Figure 17B:
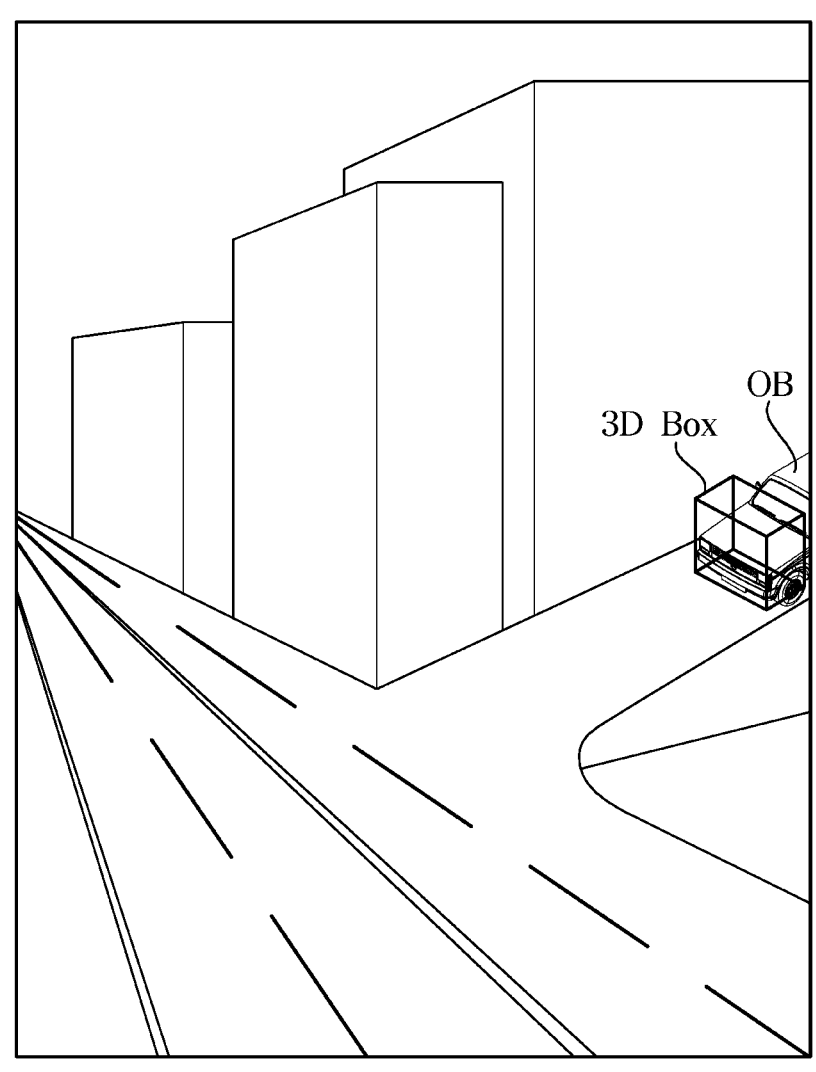

As illustrated in FIG. 17B, the processor 203 generates a 3D box with the ground height as the minimum value Zmin, but may generate a 3D box based on the location (X and Y), size (W and L), angle (Yaw), and height (H), and overlaps the generated 3D box on the object OB.

The memory 204 may store shape information of the learned object and store a type corresponding to the shape information. The shape information of the object may include image information of the object and cluster information of the object.

The memory 204 may further store a size for each type and a height for each type.

For example, height information for each type may be 1.7 m for a person, 1.5 m for a passenger car, and 3.2 m for a bus.

The memory 204 may also store image information for each type.

The memory 204 may be implemented as at least one of a non-volatile memory device such as a cache, a ROM (read only memory), a PROM (programmable ROM), an EPROM (erasable programmable ROM), an EEPROM (electrically erasable programmable ROM), and a flash memory, a vola- tile memory device such as a RAM (random access memory), and a storage medium such as a HDD (hard disk drive) and a CD-ROM, but is not limited thereto. The memory 204 may be a memory implemented as a separate chip from the processor described above with respect to the processor 203 or may be implemented as a single chip with the processor.

At least one component may be added or removed in response to the performance of the vehicle 1 illustrated in FIG. 2 and the components of the object recognition appa- ratus 200 illustrated in FIG. 3. It will be readily understood by those skilled in the art that the mutual positions of the components may be changed depending on the performance or structure of a system.

Each of the components illustrated in FIGS. 2 and 3 means software and/or hardware, for example a component such as a field programmable gate array (FPGA) and an application specific integrated circuit (ASIC).

Figure 18:
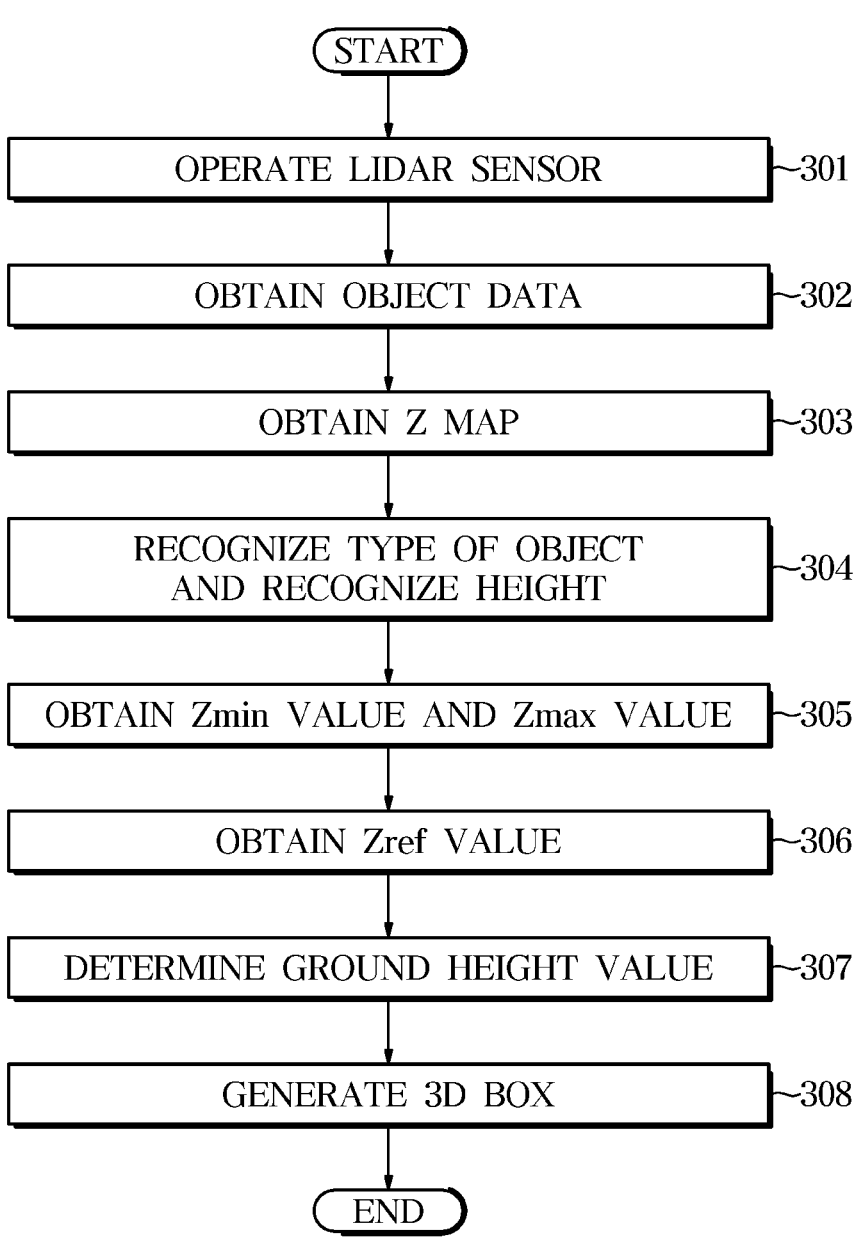
FIG. 18 is a control flowchart of the object recognition apparatus according to an embodiment.

FIG. 18 is a control flowchart of the object recognition apparatus according to an embodiment.

The object recognition apparatus 200 may operate the Lidar sensor 201 to transmit a laser (301) and recognize an object by receiving a laser reflected from the object.

The object recognition apparatus 200 may obtain a laser transmission time and a laser reception time as object data (302) and recognize object information using the object data.

The object recognition apparatus 200 may obtain point data of X-Y coordinates for each of a plurality of objects when obtaining the object data and obtain a Z map in which Z values corresponding to the point data of the X-Y coor- dinates are matched (303).

The object recognition apparatus 200 may perform object recognition through the Lidar sensor 201 using the bird eye view (BEV) algorithm. In this case, the processor 203 may obtain a Z map (ground height map) in which Z values corresponding to X values and Y values are matched through the bird eye view (BEV) algorithm. The Z value may be a ground height value.

The object recognition apparatus 200 may cluster the point data of the X-Y coordinates for each of the plurality of objects, recognize the objects through clustering, obtain shape information and location information of the object based on a direction, a distance, and an amount of points between the recognized objects, and recognize a type, loca- tion, angle, and size of the object based on the shape information and location information of the object.

Clustering of point data includes connecting neighboring points based on the direction, distance, and amount of points between the vehicle 1 and the object.

The object recognition apparatus 200 may recognize the type, location, angle, and size of each object based on the obtained shape information and location information for each object.

The object recognition apparatus 200 may recognize the type of each object by comparing the shape information for each type stored in the memory 204 with the obtained shape information for each object.

The object recognition apparatus 200 may learn the obtained shape information for each object and recognize the type of each object based on a learning result.

The object recognition apparatus 200 may recognize object information for each object in the first order based on data of the Lidar sensor 201. The object information for each object recognized in the first order may include a location (X-axis value and Y-axis value), size (W and L), angle (Yaw), and type (Class) for each object.

The object recognition apparatus 200 may recognize a height corresponding to each object type recognized from height information for each object type stored in the memory 204 (304).

The object recognition apparatus 200 may obtain a minimum value and a maximum value among Z-axis values for each object based on the Z map (305).

When a plurality of objects is recognized, the object recognition apparatus 200 may obtain a distance, that is, the longitudinal distance between each object and the vehicle 1, and may also determine a rank of the plurality of objects based on the distance order in the longitudinal direction.

The object recognition apparatus 200 may list the plurality of objects in order from the short distance to the long distance in a longitudinal direction, recognize the minimum values among ground height values of the objects, and obtain the reference value Zref of the ground height for each object by performing the multiple linear regression model for the minimum values of the ground heights of the plurality of objects (306).

That is, the object recognition apparatus 200 lists the plurality of objects in the order of the distance to the vehicle 1 in the longitudinal direction, recognizes the minimum values among the Z-axis values of the plurality of objects, graphs the minimum values of the ground heights of the plurality of objects, and then obtains the reference value Zref of the ground height for each object through the minimum value of the ground height for each longitudinal distance in the graph.

The object recognition apparatus 200 may identify a height corresponding to the type of the object, obtain the first difference value based on the maximum value and the minimum value of the ground height, determine in the first order whether the first difference value and the recognized height are the same, obtain the second difference value based on the maximum value and the reference value of the ground height, determine in the second order whether the second difference value and the recognized height are the same, and recognize the object state based on determination results of the first and second orders.

The object state may include the normal recognition state, the abnormal recognition state, the high ground recognition state, the low ground recognition state, and the state of being out of the Z range.

The abnormal recognition state may include the state of being obscured by another object and the state in which the recognition is distorted by diffuse reflection of water.

The high ground recognition state is the state of being recognized on the ground in which the ground height is greater than the reference value by the predetermined value or more, and the low ground recognition state is the state of being recognized on the ground in which the ground height is less than the reference value by the predetermined value or less.

The high ground recognition state may include the state in which an object is recognized on a hill or the like, and the low ground recognition state may include the state in which an object entering an underpass is recognized.

The object recognition apparatus 200 may finally determine the ground height of the object based on the recognized object state (307). In this case, the finally determined ground height may be the actual value of the ground height of the object.

When the ground height of the object is finally determined, the object recognition apparatus 200 may finally recognize object information for each object.

The object recognition apparatus 200 recognizes objects in an image based on the image information obtained by the camera 202 and generates 3D boxes for the objects recognized in the image based on the object information recognized by the Lidar sensor 201 (308).

The object recognition apparatus 200 may overlap the 3D boxes on the objects in the image.

The object recognition apparatus 200 may transmit 3D box information on the generated 3D boxes to the controller 144 provided in the vehicle 1.

An example of determining a ground height value will be described below.

The object recognition apparatus 200 recognizes the type of the object OB, obtains the height H corresponding to the recognized type, and obtains the maximum value Zmax, the minimum value Zmin, and the reference value Zref of the ground height of the object OB.

When the first difference value between the maximum value and the minimum value of the ground height of the object is equal to or similar to the height of the object, the second difference value between the maximum value and the reference value of the ground height is equal to or similar to the height of the object, and the object state is recognized in the normal recognition state, the object recognition apparatus 200 may determine the ground height of the object as the minimum value.

$$Zmax-Zmin=H, \quad Zmax-Zref=H \Rightarrow \text{normal recognition state}$$

When the first difference value between the maximum value and the minimum value of the ground height of the object is equal to or similar to the height of the object, and the second difference value between the maximum value and the reference value of the ground height is different from the height of the object, the object recognition apparatus 200 may determine the object state as the high ground recognition state and may determine the ground height of the object as the minimum value when the object state is recognized as the high ground recognition state.

$$Zmax-Zmin=H, \quad Zmax-Zref \neq H \Rightarrow \text{high ground recognition state}$$

When the first difference value between the maximum value and the minimum value of the ground height of the object is different from the height of the object, and the second difference value between the maximum value and the reference value of the ground height is equal to or similar to the height of the object, the object recognition apparatus 200 may recognize the object state as the abnormal recognition state.

$$Zmax-Zmin \neq H, \quad Zmax-Zref=H \Rightarrow \text{abnormal recognition state}$$

The object recognition apparatus 200 may compare the reference value and the minimum value of the ground height when the object state is determined as the abnormal recognition state and may determine the object state as the obscured state when it is determined that the reference value of the ground height is less than the minimum value.

The object recognition apparatus 200 may determine the ground height of the object as the reference value Zref when it is determined that the object OB is in the obscured state by another object.

The object recognition apparatus 200 compares the reference value and the minimum value of the ground height when the object state is recognized as the abnormal recognition state, determines the object state as the distorted state when it is determined that the reference value of the ground height is greater than the minimum value, and determines the ground height of the object as the reference value Zref when it is determined that the distortion of recognition has occurred due to diffuse reflection.

When the first difference value between the maximum value and the minimum value of the ground height of the object is different from the height of the object, and the second difference value between the maximum value and the reference value of the ground height is different from the height of the object, the object recognition apparatus 200 may determine whether the object state is the second inclined state or the state of being out of the Z range.

Zmax−Zmin≠H, Zmax−Zref≠H=>inclined low ground state or state of being out of Z range The object recognition apparatus 200 may determine whether the minimum value of the ground height of the object OB is equal to or similar to the reference value, determine the object state as the low ground recognition state when it is determined that the minimum value of the ground height of the object OB is equal to or similar to the reference value, and determine the ground height of the object as a value obtained by subtracting the height H from the maximum value Zmax when it is recognized that the object state is the low ground recognition state (Zmax−H=Zfan).

The object recognition apparatus 200 may determine whether the minimum value of the ground height of the object OB is greater than the reference value, determine the object state as the state of being out of the Z range when it is determined that the minimum value of the ground height of the object OB is greater than the reference value, and determine the ground height of the object as the minimum value when the object state is determined as the state of being out of the Z range.

As is apparent from the above, according to embodiments of the disclosure, an actual value of a ground height is recognized based on data of a Lidar sensor, and 3D information of an object is recognized based on the recognized value of the ground height, so that the accuracy of the recognition of a location of the object can be increased.

According to embodiments of the disclosure, by recognizing an object using a bird eye view (BEV) algorithm, an amount of computation can be reduced compared to a method of using three-dimensional coordinates, recognition time can be reduced, and an amount of information from two-dimensional (2D) to three-dimensional (3D) can be expanded while taking advantage of the BEV algorithm.

According to embodiments of the disclosure, even when a field of view of the Lidar sensor is obscured by objects located in the vicinity in a congested section of a road, the location and state of a distant object can be accurately recognized, and by autonomously driving based on this, a possibility of contact accidents with objects can be reduced, so that the safety of a vehicle can be improved.

As such, according to embodiments of the disclosure, the quality and marketability of a vehicle with an object recognition function and autonomous driving function can be improved, user satisfaction can be improved, user convenience and vehicle safety can be improved, and product competitiveness can be secured.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. An object recognition apparatus comprising:
a Lidar sensor; and
one or more processors, at least one of the one or more processors configured to:
    recognize objects based on data received from the Lidar sensor;
    obtain a minimum value and a maximum value among values of a ground height for each object based on the data;
    generate a ground trend line using a multiple linear regression model for the minimum value of each object;
    obtain a reference value of the ground height for each object based on the generated ground trend line; and
    determine an actual value of the ground height for each object based on a difference between the minimum value, the maximum value, and the reference value of the ground height for each object.

2. The apparatus according to claim 1, wherein the at least one processor is configured to:
obtain an X-axis value and a Y-axis value for each object based on the data received from the Lidar sensor; and
obtain a Z map in which a Z-axis value corresponding to the X-axis value and the Y-axis value for each object is matched, wherein the Z-axis value represents the ground height.

3. The apparatus according to claim 2, further comprising a memory configured to store information on a height for a type for each object, wherein the at least one processor is configured to:
recognize a type, size, and yaw angle for each object based on the X-axis value and the Y-axis value for each object; and
obtain the height corresponding to the type for each object based on the information stored in the memory.

4. The apparatus according to claim 3, wherein, to determine the actual value of the ground height of a first object of the objects, the at least one processor is configured to:
obtain a first difference value between the maximum value and the minimum value of the ground height of the first object;
obtain a second difference value between the maximum value and the reference value of the ground height of the first object; and
determine the actual value of the ground height of the first object based on whether the obtained first difference value and the height of the first object are the same and whether the obtained second difference value and the height of the first object are the same.

5. The apparatus according to claim 4, wherein the at least one processor is configured to determine the actual value of the ground height of the first object as the minimum value of the ground height of the first object based on the first difference value and the height of the first object being the same and the second difference value and the height of the first object being the same.

6. The apparatus according to claim 4, wherein the at least one processor is configured to determine the actual value of the ground height of the first object as the minimum value of the ground height of the first object based on the first difference value and the height of the first object being the same and the second difference value and the height of the first object being different.

7. The apparatus according to claim 4, wherein the at least one processor is configured to determine the actual value of the ground height of the first object as the reference value of the ground height of the first object based on the first difference value and the height of the first object being different and the second difference value and the height of the first object being the same.

8. The apparatus according to claim 7, wherein the at least one processor is configured to subtract the height of the first object from the maximum value of the ground height of the first object and determine the subtracted value as the actual value of the ground height of the first object based on the first difference value and the height of the first object being different and the second difference value and the height of the first object being different.

9. The apparatus according to claim 7, wherein the at least one processor is configured to determine the actual value of the ground height of the first object as the minimum value of the ground height of the first object based on the first difference value and the height of the first object being different, the second difference value and the height of the first object being different, and the reference value and minimum value of the ground height of the first object being the same.

10. The apparatus according to claim 1, wherein the at least one processor is configured to:
   obtain a distance between the object and a vehicle for each object;
   list the objects from a short distance to a long distance; and
   generate the ground trend line using the multiple linear regression model for the minimum values based on the list of the objects.

11. An object recognition apparatus comprising:
   a Lidar sensor; and
   one or more processors, at least one of the one or more processors configured to:
      obtain X-axis values and Y-axis values of objects based on data received from the Lidar sensor;
      recognize a type and a height of each object based on the X-axis values and the Y-axis values of the object;
      obtain Z-axis values corresponding to the X-axis values and the Y-axis values of the object, respectively;
      obtain a minimum value and a maximum value among the Z-axis values;
      generate a ground trend line using a multiple linear regression model for the minimum values among the Z-axis values of the objects; and
      obtain reference value using the generated ground trend line; and
      determine an actual value of a ground height of each object based on the minimum value, the maximum value, the reference value, and the height of the object.

12. The apparatus according to claim 11, wherein, for each object, the at least one processor is configured to:

obtain a first difference value between the maximum value and the minimum value of the ground height;
   obtain a second difference value between the maximum value and the reference value of the ground height; and
   determine the actual value of the ground height as the minimum value of the ground height based on the first difference value and the height being the same and the second difference value and the height being the same.

13. The apparatus according to claim 12, wherein, for each object, the at least one processor is configured to determine the actual value of the ground height as the reference value of the ground height based on the first difference value and the height being different and the second difference value and the height being the same.

14. The apparatus according to claim 12, wherein, for each object, the at least one processor is configured to subtract the height from the maximum value and determine the subtracted value as the actual value of the ground height based on the first difference value and the height being different, the second difference value and the height being different, and the maximum value and the reference value being the same.

15. The apparatus according to claim 12, wherein, for each object, the at least one processor is configured to determine the actual value of the ground height as the minimum value of the ground height based on the first difference value and the height being different, the second difference value and the height being different, and the reference value and the minimum value of the ground height being the same.

16. The apparatus according to claim 11, wherein the at least one processor is configured to:
   obtain a distance between the object and a vehicle for each object;
   list the objects from a short distance to a long distance; and
   generate the ground trend line using the multiple linear regression model for the minimum values based on the list of the objects.

17. A vehicle comprising:
   a vehicle body;
   a camera mounted in or on the vehicle body;
   a Lidar sensor mounted in or on the vehicle body;
   an object recognition apparatus configured to:
      obtain X-axis values and Y-axis values of an object based on data received from the Lidar sensor;
      recognize a type and a height of the object based on the X-axis values and the Y-axis values of the object;
      obtain Z-axis values corresponding to the X-axis values and the Y-axis values of the object, respectively;
      obtain a minimum value and a maximum value among the Z-axis values;
      determine an actual value of a ground height of the object based on the minimum value, the maximum value, a reference value, and the height of the object; and
   generate a three-dimensional box for the object based on the determined actual value of the ground height of the object; and
   a controller configured to control autonomous driving or collision warning based on image information obtained by the camera and the determined actual value of the ground height of the object,
   wherein the object is provided in plural, and
   wherein the object recognition apparatus is configured to:

generate a ground trend line using a multiple linear regression model for the maximum value among the Z-axis values of the objects; and obtain the reference value using the generated ground trend line.

18. The vehicle according to claim 17, wherein the object recognition apparatus is configured to:

obtain a first difference value between the maximum value and the minimum value of the ground height of the object;

obtain a second difference value between the maximum value and the reference value of the ground height of the object; and determine the actual value of the ground height of the object based on whether the first difference value and the height of the object are the same and whether the second difference value and the height of the object are the same.

19. The vehicle according to claim 18, wherein the object recognition apparatus is configured to:

determine the actual value of the ground height of the object as the reference value of the ground height of the object based on a determination that the first difference value and the height of the object are different and a determination that the second difference value and the height of the object are the same; and subtract the height of the object from the maximum value and determine the subtracted value as the actual value of the ground height of the object based on a determination that the first difference value and the height of the object are different, a determination that the second difference value and the height of the object are different, and a determination that the maximum value and the reference value are the same.

20. The vehicle according to claim 17, wherein the object recognition apparatus is configured to:

obtain an X-axis value and a Y-axis value for each object based on the data received from the Lidar sensor; and obtain a Z map in which a Z-axis value corresponding to the X-axis value and the Y-axis value for each object is matched, and wherein the Z-axis value represents the ground height of the object.

* * * * *